United States Patent [19]

Nussbaum

[11] Patent Number: 5,809,462
[45] Date of Patent: Sep. 15, 1998

[54] METHOD AND APPARATUS FOR INTERFACING AND TRAINING A NEURAL NETWORK FOR PHONEME RECOGNITION

[75] Inventor: Paul A. Nussbaum, Long Beach, N.Y.

[73] Assignee: Ericsson Messaging Systems Inc., Woodbury, N.Y.

[21] Appl. No.: 807,786

[22] Filed: Feb. 28, 1997

Related U.S. Application Data

[62] Division of Ser. No. 427,667, Apr. 24, 1995.
[51] Int. Cl.$^6$ .................................. G10L 5/06; G10L 9/00
[52] U.S. Cl. .......................... 704/232; 704/243; 704/259; 704/275
[58] Field of Search .................................. 704/232, 243, 704/259, 275

[56] References Cited

U.S. PATENT DOCUMENTS

| 5,040,214 | 8/1991 | Grossberg et al. . | |
|---|---|---|---|
| 5,163,111 | 11/1992 | Baji et al. | 704/232 |
| 5,426,745 | 6/1995 | Baji et al. . | |

OTHER PUBLICATIONS

Dalsgaard P. et al., Interactive Labelling of Multi–Lingual Speech Corpora, ICASSP 92,pp. I–549–52.
Hwang J–N, Hang, L., Interactive Query Learning for Isolated Pattern Recognition, NNSP II '92, pp. 93–94.
Hwang J–N, Hang, OL., Interactive Query Learning for Isolated Pattern Recognition, NNSP II '92, pp. 93–94.
Handbook of Neural Computing Applications, by A. Maren et al., 1990, pp. 92–103, 142–145, 402–403.

(List continued on next page.)

*Primary Examiner*—David R. Hudspeth
*Assistant Examiner*—Robert Louis Sax
*Attorney, Agent, or Firm*—Nixon & Vanderhye P.C.

[57] ABSTRACT

An automated speech recognition system converts a speech signal into a compact, coded representation that correlates to a speech phoneme set. A number of different neural network pattern matching schemes may be used to perform the necessary speech coding. An integrated user interface guides a user unfamiliar with the details of speech recognition or neural networks to quickly develop and test a neural network for phoneme recognition. To train the neural network, digitized voice data containing known phonemes that the user wants the neural network to ultimately recognize are processed by the integrated user interface. The digitized speech is segmented into phonemes with each segment being labelled with a corresponding phoneme code. Based on a user selected transformation method and transformation parameters, each segment is transformed into a series of multiple dimension vectors representative of the speech characteristics of that segment. These vectors are iteratively presented to a neural network to train/adapt that neural network to consistently distinguish and recognize these vectors and assign an appropriate phoneme code to each vector. Simultaneous display of the digitized speech, segments, vector sets, and a representation of the trained neural network assist the user in visually confirming the acceptability of the phoneme training set. A user may also selectively audibly confirm the acceptability of the digitization scheme, the segments, and the transform vectors so that satisfactory training data are presented to the neural network. If the user finds a particular step or parameter produces an unacceptable result, the user may modify one or more of the parameters and verify whether the modification effected an improvement in performance. The trained neural network is also automatically tested by presenting a test speech signal to the integrated user interface and observing both audibly and visually automatic segmentation of the speech, transformation into multidimensional vectors, and the resulting neural network assigned phoneme codes. A method of decoding such phoneme codes using the neural network is also disclosed.

30 Claims, 10 Drawing Sheets

OTHER PUBLICATIONS

Data Translation, Inc. 1993 Applications Handbook, vol. 2, No. 1, "For the Unwary, Aliasing Generates Problems in Unexpected Areas," Jul. 1992, by R. Calkins, p. 125.

Creative Labs, Inc. Sound Blaster Pro User Reference Manual, Feb. 1992, pp. 11–12.

Signal Analysis, by Athanasio Papoulis, 1977, Chapter 3–4 "Discrete Fourier Series and Fast Fourier Transforms," p. 79.

Neuralware, Inc. Neural Computing, "Back–Propagation," 1991, pp. NC–89–NC94.

Neuralware, Inc. Reference Guide, 1991, pp. RF–20, RF–36–RF–40, RF–171–RF–214, RF–217–220.

Technology—The Freedom to Dial Hands–Free, "Voice Recognition Technology Provides Hand's Free Dialing for Cellular Phone Users," by S. Bayle, Mar. 1993, pp. 36–38.

NASA Tech Briefs, "Voice–Recognition System Records Inspection Data," by L. Rochester, Jan. 1993, p. 50.

IEEE, "Application of Fully Recurrent Neural Networks for Speech Recognition," by S. Lee et al., 1991, pp. 77, 79.

Proceedings of the IEEE, vol. 78, No. 10, "Neural Network Models of Sensory Integration for Improved Vowel Recognition," by B. Yuhas et al., Oct. 1990, pp. 1658, 1660.

Neural Networks, vol. 3, "Speaker–Independent Isolated Digit Recognition: Multilayer Perceptrons vs. Dynamic Time Warping," by L. Bottou et al., 1990, p. 453–455.

Neural Computation, "Review of Neural Networks for Speech Recognition," by R. Lipmann, 1989, pp. 1–37.

IEEE, "Integrated Training for Spotting Japanese Phonemes using Large Phonemic Time–Delay Neural Networks," by M. Miyatake et al., 1990, pp. 449–450.

Numerical Recipes in C—The Art of Scientific Computing, by W. Press et al., 1990, pp. 447–466.

"A Novel Objective Function for Improved Phoneme Recognition Using Time Delay Neural Networks," by J.B. Hampshire II et al., pp. I–235–I–241.

Automated Speech Recognition, by K. Lee, pp. 43–50.

"On the Use of Neural Networks and Fuzzy Logic in Speech Recognition," by A. Amano et al., p. I–301.

IEEE Transactions on Neural Networks, vol. 1, No. 2, "Parallel, Self–Organizing, Hierarchical Neural Networks," by O. Ersoy et al., Jun. 1990, p. 167–168.

IEEE Transactions on Neural Networks, vol. 2, No. 1, "Differential Competitive Learning for Centroid Estimation and Phoneme Recognition," by S. Kong et al., Jan. 1991, pp. 118, 120, 123.

"A Spatio–Temporal Pattern Recognition Approach to Word Recognition," by M. Tom et al., Feb. 1989, p. I–351.

Speaker–Independent Phoneme Recognition on TIMIT Database Using Integrated Time–Delay Neural Networks (TDNNs), by N. Hataoka et all., 1989, pp. I–57–I–59.

Neural Computation, "Modular Construction of Time–delay Neural Networks for Speech Recognition," By A. Lippmann, 1989. pp. 1, 2, 41.

"Representational Issues in a Neural Network Model of Syllable Recognition," by M. Rossen et al., 1989, pp. I–19, I–21.

Neural Networks, vol. 3, "A Time–Delay Neural Network Architecture for Isolated Word Recognition," by K. Lang et al., 1990, pp. 23, 28.

METHOD AND APPARATUS FOR INTERFACING AND TRAINING A NEURAL NETWORK FOR PHONEME RECOGNITION

This is a division of application Ser. No. 08/427,667, filed Apr. 25, 1995.

FIELD OF THE INVENTION

The present invention relates to speech recognition, and in particular, to a tool for developing a neural network for phoneme recognition.

BACKGROUND AND SUMMARY OF THE INVENTION

Speech recognition is a complex field requiring knowledge in various otherwise unrelated fields including: signal processing, pattern recognition, artificial intelligence, statistics, information theory, probability theory, computer algorithms, psychology, linguistics, and biology. Even drawing upon this vast body of knowledge, researchers in speech recognition still struggle with developing how to best incorporate all the various areas of knowledge in the recognition systems, how to select units of speech that are context insensitive, and how to distinguish between multiple-speakers. As a result, speech recognition systems place constraints on the speech data to be processed such as speaker dependance, isolated word phrasing, a small vocabulary, and constrained grammar.

Speech uses voiced and unvoiced audio signals. Voiced speech consists of sounds like vowels, while unvoiced speech includes whispers or sounds like the letter "S". Voiced speech begins with the larynx, which generates a signal similar to a pulse train by forcing air between the vocal chords, which in turn slap together and produce a pulsed sound. Speech is generated by moving the mouth and tongue to change the timbre of the voiced sound. The rate at which the vocal chords slap together determines the pitch of the speech. Pitch is naturally higher for children and female speakers. But even for a single speaker, pitch changes from word to word, and even within words. Speech also includes unvoiced components that use an unmodulated air stream passing through the separated vocal chords of the relaxed larynx.

The position of the tongue and jaw (and to some extent the lips) determines the resonant frequencies of the vocal tract referred to as formants. The pitch (rich in harmonics) is filtered or modulated by the speaker's vocal tract. Like pitch, formants vary from speaker to speaker. Formants generally occur at higher frequencies than the base frequency of the pitch (FO). The first formant (F1) is the lowest frequency formant, or major peak in the spectrum envelope, once pitch (F0) is removed. Formants move constantly in speech and classifying sounds is made more difficult by formant transitions.

There are other variables that also complicate speech recognition. For example, noise is virtually always present in real world speech. Only some noise may be filtered prior to digitization. Even the process of training a neural network to recognize speech itself adds Gaussian noise. Moreover, because most speech recognition systems are digital, the analog speech signal must first be converted in a digital format, before it can be processed and recognized using a computer based system. Unfortunately, in digitizing a signal, some of the signal context is lost.

Since speech signals vary widely from word to word, and also within individual words, speech is analyzed using smaller units of sound generally referred to as a phoneme. Different sounds are enumerated by phonetic alphabets, and words can be phonetically spelled using these alphabets. A phonetic alphabet describes how each word is to be spoken aloud. More formally, however, a phoneme is the smallest unit of sound in a given language that changes the meaning of a word. English has about 31 to 38 phonemes. Some languages have as many as 45 or as few as 13 (Hawaiian). In general, neural networks for speech recognition encode speech as a sequence of phonemes.

While the present invention uses the term phoneme for purposes of explanation, units of speech other than the phoneme could of course be used. For example, if a large vocabulary system is being developed, it may be important to take co-articulatory effects into account, i.e. the way adjacent phonemes change one another when they occur in the same word.

Because of the large number of variables involved in the speech recognition decision making process (a few of which were just described), several signal analysis techniques for pattern recognition are based on nonanalytical methods which use "training" to arrive at parameters of the system later used to perform that pattern analysis. Training is a method wherein a system such as a neural network is presented with examples of the pattern(s) to be recognized, system performance/response is measured, and system parameters are modified to reduce the error of the output/performance/response. This iterative process ultimately improves system performance. In addition, such a trained system can be developed without expert knowledge of the pattern(s) that is to be recognized.

This is the foundation of neural networks: internal network parameters, e.g., neural network weights, that allow it to recognize particular phoneme patterns are determined using training examples repeatedly presented to the network. A training algorithm uses the networks response/performance during training to modify/correct the network parameters. Clearly then, optimum performance of the neural network depends upon the quality of the training examples presented to it.

The present invention provides a tool for developing a training set for training a neural network for phoneme recognition and uses this training data set to develop the neural network for phoneme recognition itself. First, an input speech signal is digitized and segmented. A segment is a sequence of speech samples that occur sequentially in time where a sample is a digitized audio amplitude value of speech at a moment in time. The segmentation of speech is based upon visually discernible features or patterns of the speech. Next, segments are then transformed from the time domain into another domain, e.g. the frequency domain, where it is easier to analyze component parts (sounds) unique to that speech signal. Transformed segments of speech are represented mathematically as sets of one or more vectors, each vector having multiple dimensions, e.g., a 5-dimensional vector is defined by five elements or variables. By transforming the speech into a series of multidimensional vectors, similar or substantially similar vectors representing essentially the same phonemes may be grouped together to represent a segment of speech signals. The neural network generally classifies or "codes" each vector set corresponding to a segment as being one of a predetermined set of phonemes.

In testing the trained neural network, another uncoded speech signal is digitized and automatically divided into individual segments, with each segment being transformed into a set of one or more vectors, each vector having plural dimensions. In contrast to development, during testing an operator does not assign a phoneme code to these segments. Instead, the trained neural network processes the vector sets to recognize phonemes and automatically assign a phoneme code to each of the vectors, each code corresponding to a recognized phoneme. The phoneme code most frequently assigned in a particular vector set is selected for the vector set and assigned to the corresponding speech segment.

The present invention enables a relatively unskilled operator to "train" a neural network coding scheme to recognize phonemes and to educate the operator regarding a large number of techniques that may be employed in that training. The training of a neural network is the foundation upon which the neural network recognizes speech sounds, and the recognition is only as accurate as the initial known phonemes in the training set. Thus, the preparation and testing of a suitable and accurate training set is a very significant factor in determining how well the neural network will ultimately recognize speech.

After each segment is transformed into a vector set, a reverse transformation mechanism allows the user qualitative audio verification of the information content of the transformation vector sets corresponding to a phoneme segment. Since the input vectors and their phoneme codes are known, the parameters of the neural network are iteratively modified to output the appropriate phoneme code. A reverse coding mechanism (decode) allows qualitative audio verification of the content of the coded segments by audibly reproducing sounds corresponding to phoneme codes selected by the trained neural network.

The present invention permits both visual and audible evaluation of the performance of the developed speech recognition system. For example, corresponding segments, vectors, assigned phoneme codes, and representations of the internal state of the neural network (e.g., a centroid indicating the neural network's exemplary or "best" vector corresponding to a phoneme) may be simultaneously displayed on a single display screen for comparison by an operator.

Still further, the digitized signals and one or more of the segments may also be audibly reproduced to determine qualitatively the acceptability of the digitization technique and segmentation techniques previously used. If the produced results are unacceptable, the digitization and/or the segmentation may be modified by an operator. To ensure that the transformation procedure does not distort the phoneme training set, the present invention provides for reverse transformation of one or more of the vector sets and an audible reproduction of those reverse transformed vectors to permit an operator to confirm audibly the acceptability of the transformation process. In other words, if the operator can recognize one or more of the training set of phonemes when the reverse transform vectors are audibly reproduced, then the transformation process (and hence the training data) are acceptable for training a neural network. Otherwise, if the operator cannot audibly discern the original set of training phonemes, the training set is likely to be unacceptable and some parameter must be changed.

A neural network assigned phoneme code can be automatically decoded to generate an estimate of an exemplary vector representing a corresponding phoneme. The estimate exemplary vector may be for example (depending upon the neural network used) a centroid of the set of vectors in vector space used to train the neural network to recognize a particular phoneme having plural dimensions corresponding to the code generated while training the neural network. For other neural networks, the exemplary vector may be a best guess of such a centroid. The centroid reflects ultimately the internal structure and parameters of the trained neural network which evolved during training to recognize vectors corresponding to a particular phoneme. The estimate exemplary vector is then reverse transformed into a time varying signal. The time varying signal is audibly reproduced to evaluate the performance of the speech recognition system.

In other words, in response to a testing input signal, the neural network assigned phoneme codes are the neural network's speech recognition result. By decoding those codes and generating an estimate vector, the estimate vector can further be reverse transformed into a signal that can be audibly reproduced to permit an operator to audibly determine how well the neural network did in recognizing the speech. For example, if the neural network was supposed to recognize a phoneme "OO" but assigned a code corresponding to an "AA" phoneme, the audibly reproduced signal would immediately enable an operator to determine that an error had been made. Upon detection of such errors, modifications can be made to retrain the neural network.

The present invention permits the dividing of the digitized audio signals into segments to be accomplished manually or automatically. Segments are intended to represent a single unit of speech, a phoneme, where each segment contains a set of one or more vectors. When developing a training set for a supervised neural network, the user will examine the segments, both visually and audibly, and assign a correct phoneme code to each. When the segment is added to the training data set, each transform vector in the vector set corresponding to the segment is identified as being an example of this phoneme. In this way, the user does not need to assign a phoneme to every transform vector individually. This is both a time saving measure, and one that permits the user to work with longer stretches of speech data, when visually and audibly confirming their phoneme content.

Once the neural network is trained and operating, the neural network assigns a phoneme code to each segment (phoneme codes are sometimes simply referred to as codes). The neural network examines each vector in the vector set corresponding to the segment and assigns to it a phoneme code. The entire segment is then assigned the "most popular" (i.e., most frequently assigned) phoneme code in the vector set.

In many cases, continuous speech can be so fast that it is impossible to assign a segment small enough, or positioned with enough accuracy, to contain single unambiguous phoneme. In this case the invention offers the option of assigning two possible phoneme codes corresponding to two possible phonemes that might be contained in the segment. This dual phoneme assignment is referred to as the "pairs method," because a segment is assigned a pair of possible phoneme codes. For example, assume four pseudo-words are each spoken quickly: "boo", "goo", "ba", "ga". Each pseudo-word is assigned a single segment, where each of the four segments encompasses an entire pseudo-word and contains some number of transform vectors. The user adds these segments to the training set, assigning to the segments, (and therefore to each transform vector contained in the vector set corresponding to the segment), the phoneme pairs, respectively: "b or oo", "g or oo", "b or ah", "g or ah". The neural network trained with this data set can then determine, when presented with a new test pseudo-word ending in "OO", whether or not the vowel was preceded by a "b" or a "g", etc. This decision occurs despite the absence of a segment in the training set containing only the sound "g" or only the sound "b". The method whereby the supervised neural network is trained with the pairs method differs slightly for each different type of neural network. However, the common aspect of these training methods is that when a transform vector is presented during training, the neural network will not be penalized (i.e., error will be deemed low) for identifying the vector as being either of the pair of phonemes. Without the pairs method, all but one correct response of the neural network during training would be penalized (i.e., would result in a high error).

The present invention provides a user interface which permits an operator to select and modify various inputs while developing the neural network. For example, the operator can select with a mouse click whether he wants to manually or automatically segment speech. Speech can be segmented manually using that mouse pointing device with each manually selected segment being highlighted on the display screen. The operator selects one of plural transformation algorithms including a frequency based transformation such as a fast Fourier transform (FFT and a nonfrequency base transformation such as linear predictive coding (LPC). Both transformation algorithms convert each segment into a set of one or more multiple dimension vectors. A display of these multidimensional vectors is provided on a two dimensional display screen. Moreover, an operator can select between a number of different types of neural networks including for example supervised, unsupervised, auto associative, and back propagation types of neural networks.

Ultimately, the input audio signal (i.e., a digitized version thereof, the phoneme segments, the corresponding transform vector sets, phoneme codes, and estimate vectors (e.g., centroids) are all displayed on a single screen. An operator may then visually confirm the acceptability of any one of these parameters based on a degree of visual similarity between the corresponding portions of the displayed audio signal segments, transform vector sets, phoneme codes, and/or centroids. Each of the above displays corresponding to the same phoneme should have a similar visual appearance. A dissimilar visual appearance is an indication to the operator that adjustment needs to be made.

These features as well as other features and advantages will be described more fully below in conjunction with the figures in the detailed description of the invention.

DETAILED DESCRIPTION OF THE INVENTION

Figure 1:
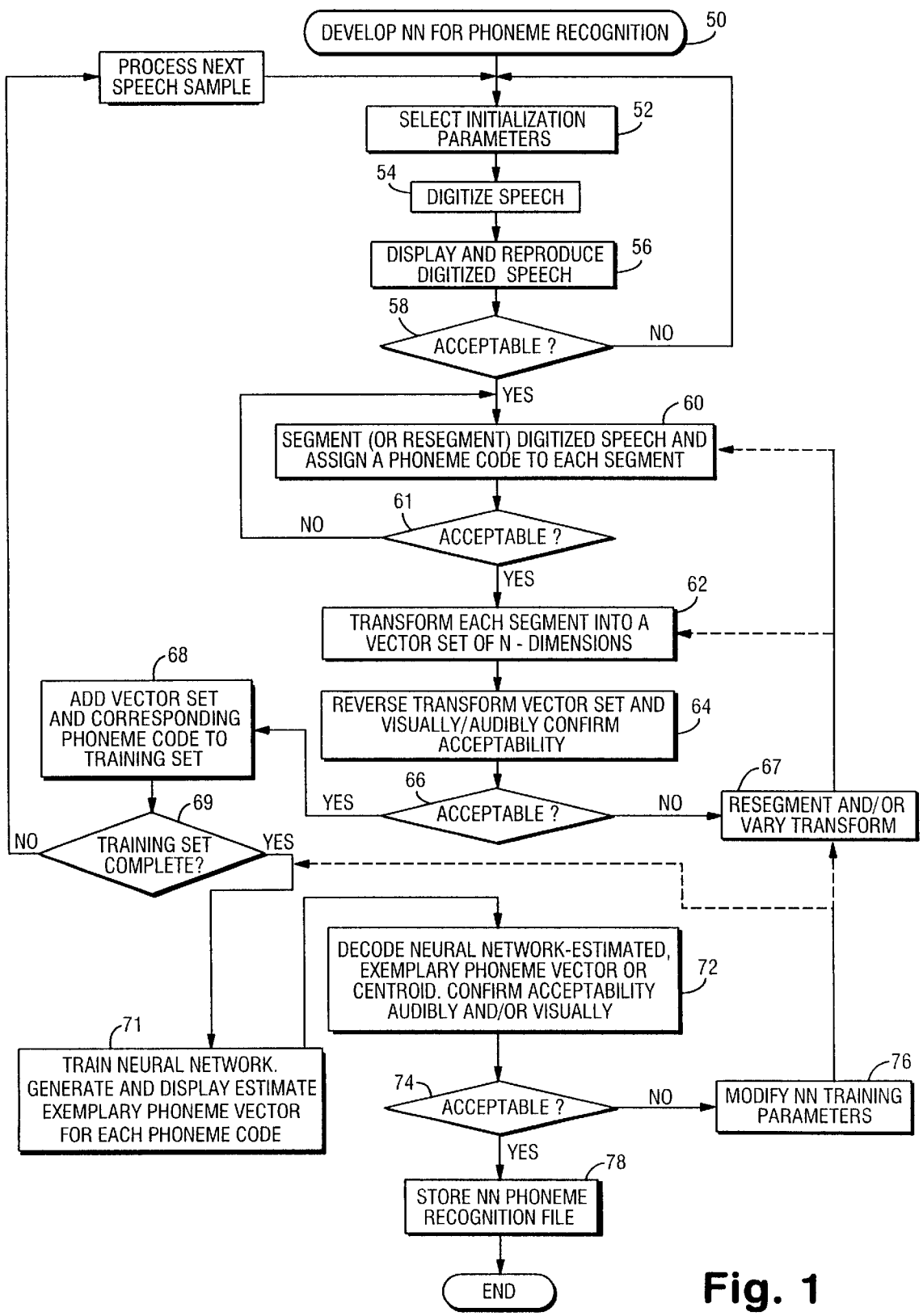
FIG. 1 is a flow chart diagram outlining the basic steps for developing a neural network for phoneme recognition in accordance with the present invention.

In the following description, for purposes of explanation and not limitation, specific details are set forth, such as particular hardware and techniques in order to provide a thorough understanding of the present invention. However, it will be apparent to one skilled in the art that the present invention may be practiced in other embodiments that depart from these specific details. In other instances, detailed descriptions of well known methods, devices, and circuits are omitted so as not to obscure the description of the present invention with unnecessary detail.

An overview of the development of a neural network for phoneme recognition will now be described in conjunction with the flowchart illustrated in FIG. 1. In general, the development of a neural network for phoneme recognition may be divided into several stages. The first stage is to generate an acceptable speech phoneme training set illustrated in FIG. 1 as blocks 50–70. The second stage is to train a neural network using that training set as illustrated in blocks 71–78. After training, the neural network is tested using a different set of speech samples as illustrated in FIG. 2. If the test proves unsatisfactory, the training set may be modified and/or the neural network retrained.

With respect to the first stage of developing an acceptable speech phoneme training set in the process of developing a neural network for phoneme recognition (block 50), an operator selects various initialization parameters (block 52) as will be described in further detail below. An input speech signal is digitized (block 54), and the digitized speech is displayed (block 56). An operator can reproduce the digitized speech signal using digital to analog converter 34, amplifier 36, and speaker 38 to audibly confirm that the digitized speech signal satisfactorily represents the input analog speech. If the digitized speech input is either visually or audibly unacceptable (block 58), control returns to block 52 where the user may vary the initialization parameters and/or the digitization technique and/or parameters, (e.g., increase sampling), to improve the digitized input. For example, if it is visually observed that certain words or utterances are at a much lower amplitude level then others, the gain of the amplifier used prior to digitization may be adjusted. As an example of audible confirmation, the user may determine that a specific section of the speech contains a burst of background noise, and as a result, may choose not to use this portion as a training example.

An acceptable digitized speech signal is then segmented (or resegmented), and a phoneme code is assigned to each segment (block 60). Ideally, each segment represents one speech phoneme and silence is not segmented. As will be described in further detail below, the segmentation process may occur manually or automatically. The user may also visually and audibly confirm the acceptability of each segment of digitized speech. If it is not acceptable (block 61), e.g., one of the segments is garbled or the two segments sound alike, the segmentation process is repeated. Otherwise, each segment is then transformed (block 62) into a vector set including one or more vectors, each of the vectors having N dimensions. For example, a three dimensional vector has three components/elements in vector space. A user may also confirm both visually and audibly the suitability of each vector set corresponding to a phoneme segment (block 64). As an example of audible confirmation, each vector set may be reverse transformed, converted back to an analog signal, and audibly reproduced to determine if it acceptably represents a corresponding phoneme. If the vector set is unacceptable (block 66), a user may resegment the digitized speech and/or vary the transformation parameters (block 67). As an example of visual confirmation, the user may observe that the transform vectors in a vector set/segment vary greatly. This may lead the user to reduce the size of the segment or employ the pairs method referenced above and described further below.

If the vector set is acceptable, it is added to the training set along with its corresponding phoneme code (block 68). A decision is made in block 69 whether the training set is complete. If not, the next speech sample is processed (block 70) repeating the procedure outlined in blocks 52–69. The user may confirm the contents of the training set including the number of training examples for each phoneme added. If the training set is complete, control proceeds to stage two—training the neural network with that training set.

More specifically, a neural network selected by an operator classifies each vector set by assigning a phoneme code to each input vector set corresponding to an input speech segment based on the neural network learning algorithm. Along with that code, an estimate exemplary phoneme vector (e.g., a centroid) corresponding to that segment is generated (block 71). The NN-assigned phoneme code is the neural network's best guess as to what phoneme corresponds to the input vector set. That guess is based upon knowledge of speech phonemes gained by the neural network as it "trains" itself or "learns" using the training set. In the training process, the neural network configures its internal parameters to recognize certain speech phonemes. In addition to the phoneme code (i.e., a number) output by the neural network, the integrated user interface of the present invention also displays a visual presentation of what the neural network believes it recognized, i.e., the estimate exemplary vector of what the input vector looks like which corresponds to the output phoneme code. In some neural networks, this estimate exemplary vector is called a centroid. That estimate exemplary vector or centroid may be decoded (block 72) to produce an audible signal corresponding to the phoneme code which permits an operator to audibly confirm the phoneme recognized by the neural network by comparing it with the known phoneme input from the training set.

Visually, the neural network estimate exemplary vector or centroid is displayed in a format that can be easily compared to the transformed vector set which the neural network was trying to recognize. In a properly trained neural network for phoneme recognition, the input vector set corresponding to a speech segment visually resembles the output vector centroid for that speech segment. If the neural network output is acceptable (block 74), the neural network phoneme recognition file including the parameters of the trained neural network is stored (block 78) for future use. Otherwise, the operator has the option (block 76) to modify the neural network training parameters at any stage in the training process.

Figure 2:
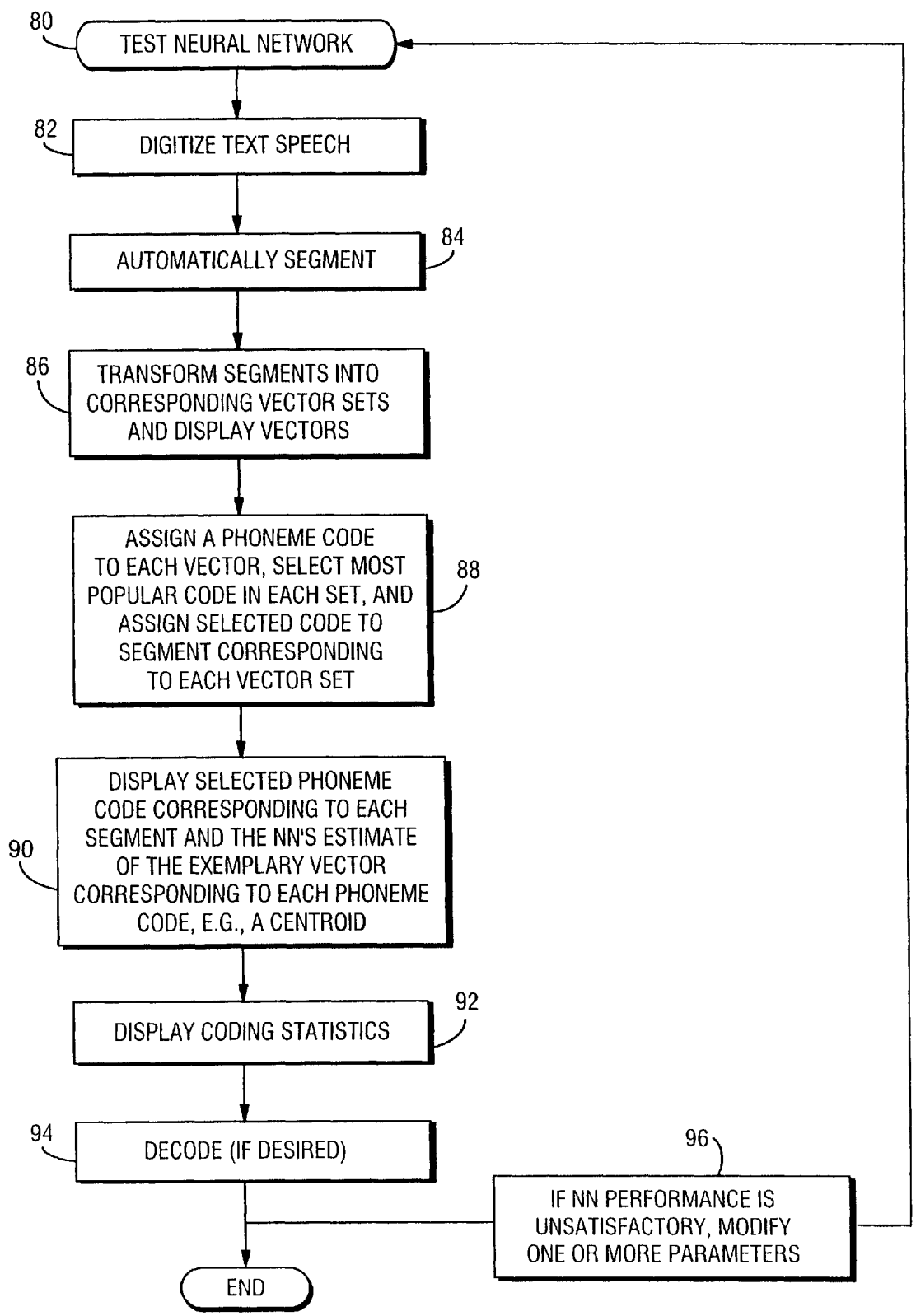
FIG. 2 is a flow chart diagram showing a procedure for testing a neural network recently trained.

Thus, FIG. 1 describes in general the development of a neural network for phoneme recognition. FIG. 2 describes generally the process for testing a neural network so developed using the same integrated user interface used to train the neural network. To test or evaluate the neural network (block 80), another speech signal is digitized (block 82), and automatically segmented into phonemes in accordance with an automatic segmentation routine described in further detail below (block 84). The segments are then transformed into corresponding sets of vectors (block 86), and the neural network (now trained) assigns a phoneme code to each vector in the vector set. The most popular phoneme code assigned in the vector set is selected and generally assigned to the segment corresponding to that vector set (block 88). The integrated user interface then displays the assigned phoneme code corresponding to each segment along with the estimate of the exemplary vector corresponding to the assigned phoneme code, e.g., a neural network centroid (block 90). Various neural network coding statistics are displayed identifying the phoneme codes assigned to each vector that the neural network considered in its most popular code decision (block 92). The estimate of the exemplary vector may also, if desired, be decoded for audible confirmation/evaluation of the neural network's performance (block 94). If the neural network performance is unsatisfactory, an operator may modify one or more parameters (block 96) to change processing of speech subsequently input to the neural network for further real-time testing of the neural network.

Figure 3:
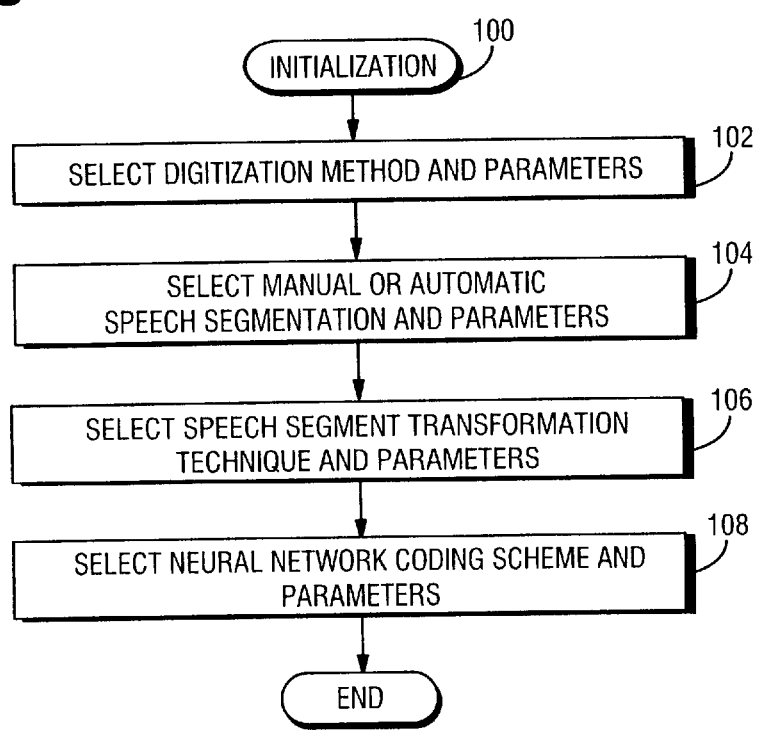
FIG. 3 is a flow chart diagram showing initialization procedures performed as a part of the neural network development feature.

A general flow diagram indicating the initialization procedures to be performed at the beginning of neural network development is illustrated in FIG. 3. An operator selects a digitization method and various digitization parameters in block 102. Manual and automatic speech segmentation parameters must be determined and one of the segmentation modes selected depending upon whether the neural network is being trained or tested (block 104). The speech segment transformation technique and transformation parameters are selected (block 106). Finally, the neural network and associated neural network parameters used to code the speech are selected (block 108).

Figure 4:
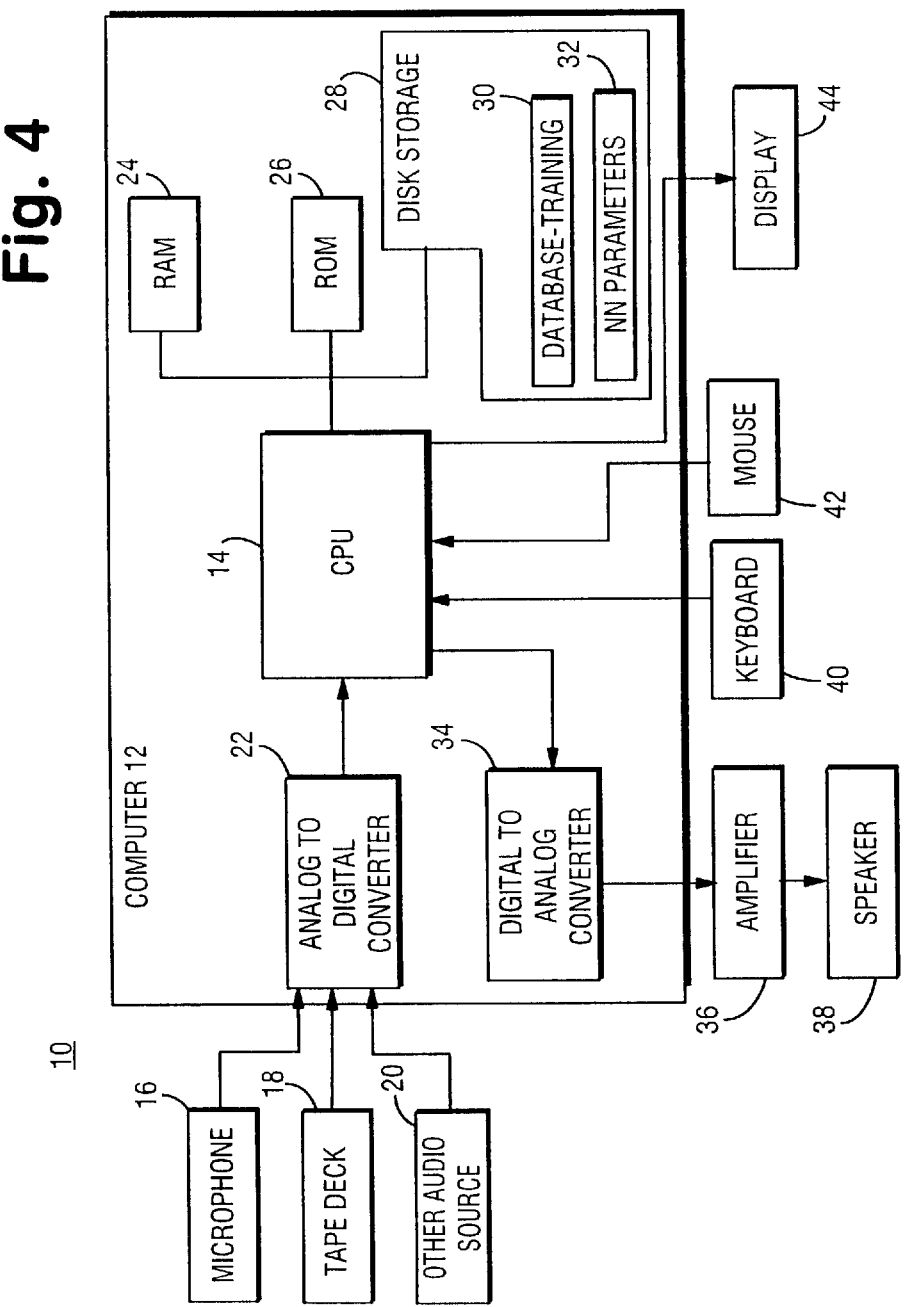
FIG. 4 is a function block diagram showing a computer work station which may be used to implement integrated user interface according to the present invention.

An integrated neural network tool 10 for implementing the present invention is computer based and may be compatible with a windows type operating system, such as MICROSOFT WINDOWS™. Example hardware is illustrated in FIG. 4. The integrated neural network tool 10 includes a computer 12 such as a personal computer or computer work station which includes a conventional CPU 14 and associated memory including RAM 24, ROM 26, and disk storage 28. Disk storage 28 includes database training files 30 and neural network parameters 32. A microphone 16, a tape deck 18, or other audio source 20 inputs a speech signal to an analog to digital converter 22 which digitizes the analog speech signal. This analog to digital conversion process may be performed using conventional software and hardware with a user being permitted to select various digitization parameters to achieve the necessary quality for neural network training and testing. The digitized signal is then fed to CPU 14 for processing. Signals to be reproduced are provided to digital to analog converter 34 which again may be software and/or hardware based. The analog output thereof is amplified in amplifier 36 with the amplifier output being used to drive a conventional speaker 38. A user/operator interacts with the integrated neural network development tool 10, using a keyboard 40, a mouse 42, and display 44.

Disk storage 28 includes for example five megabytes for storing of data, four megabytes of RAM 24, and one kilobyte of ROM 26. A software, multi-media interface driver (MMD) for audio playback and recording is stored in disk. A software, multi-media interface stored in disk (which also may be Windows™ based) manipulates audio data and specifies the file format of speech data stored on disk and the digitization scheme of the audio data. Speech is digitized for example in an 8-bit amplitude value, mono-speaker format and recorded at 11,025; 22,050; or 44,100 bytes per second. A personal computer (PC) "SoundBlaster" card (not shown) may be used for example to record and play back new voice samples using analog-to-digital and digital-to-analog conversion hardware. Alternatively, if playback only (no recording) is required, a speaker software driver, such as Windows'SPEAKER.DRV PC, may be used to playback digitized speech without special hardware. Other available software such as the Window's SOUNDREC program may also be used to facilitate recording and playback of audio data.

In general, segmentation allows the user to select just those parts of a speech signal corresponding to speech phonemes which are then used to train the neural network. During training, the user assigns a single identification value, i.e., a phoneme code, to each manually segmented portion of digitized speech to identify numerically (or otherwise) the specific phoneme the segment represents. These known phoneme segments are then transformed into vector sets and used to train the neural network. Specifically, based on the difference/error between the output of the neural network (its current guess at the phoneme code corresponding to the recognized input phoneme vector set) and the phoneme code the user as signed to the input phoneme segment the neural network is trying to recognize, the neural network parameters, e.g., neural network weights, are corrected/modified.

Manual segmentation is conducted using the mouse. The user sees both the amplitude envelope of the selected segment, and after transformation, the multi-dimension vector representation of the segment. Adding and removing segments is quick and requires no keypad entry. Accordingly, the user can easily refine and visually confirm phoneme segment selection.

Manual phoneme classification requires the selection of voice segment start and end points that encompass only a single phoneme. This selection may be a difficult task because of the complex nature of speech. The present invention provides a procedure for automatically segmenting an input, digitized speech signal using segmentation parameters selected by the user. To remove silence in automatic segmentation, the user selects the segmentation criteria using for example segment menu option which opens a temporary data entry window with the following fields that can be filled in by the user:

Silence threshold: the minimum number of amplitude increments (either positive or negative) that a voice data sample must have to be considered non-silence Thus, if no segments are to be selected, a suitably high value in put (e.g. 255).

Silence duration: the maximum number of silence data values (as defined by threshold above) that must be encountered before a section of data is determined to be a silence section.

Minimum segment length: the minimum number of data points in a segment. This value apples to both automatically selected segments and manually selected ones. In general, this value will be equal to or greater than the number of bytes in a transformation window.

Maximum segment length: the maximum number of data points that can be in a segment. This value applies to both automatically selected segments and manually selected ones. Once this number of data points is reached, the automatic segmentation algorithm stops, assigns the data points to a segment, and proceeds to search for the next segment.

In order to present quality examples of each phoneme, the user should ensure that the segments are situated in important parts of the speech data (around vowels for example). The user may also want to set the minimum and maximum segment length values to be equal so that each segment will have an equal number of resultant transformation vectors, and ultimately, an equal number of training examples.

As each segment is selected, it appears as a segment data bar in a display visualization window (described below in more detail in conjunction with FIG. 9). In this way, the user determines if the segmentation criteria are valid Using the visualization window according to the present invention, the user may verify that (1) the segment encompasses the desired section of voice data; (2) the segment is situated directly below the voice data it encompasses; (3) the visual bounds of the segment left and right edges) are aligned with the bounds of the corresponding segmented speech data; (4) the transformation data encompassed by the segment is approximately uniform if the segment is to be classified as being one phoneme or vowel; (5) the transformation data for the segment appears directly below the segment and has the same left and right bounds as the segment.

Each segment is identified with a corresponding phoneme ID or code. If a supervised neural network is in use (e.g., back propagation), the user manually identifies speech segments to be used for training. If an unsupervised neural network is used (e.g., Autoassociative), the user need only identify the total number of different phoneme classifications that exist in the training phoneme set. A user can listen to selected speech segments via a menu replay option. As a result, a user can audibly confirm whether the segment (especially a segment for training a neural network) sounds like the phoneme its supposed to represent.

Once all of the segments on the screen are identified (again not necessary if an unsupervised neural network is selected), the user saves them in the current training data set on disk. The user may then load up another speech file to add more segments to the training set.

If a user cannot divide a sample of speech so only one phoneme is present in that divided segment, then the "pairs method" in accordance with the present invention is advantageous. A segment is identified as being more than one phoneme. The neural network does not have an indication of where the one phoneme ends and the other begins. Therefore, during neural network training, both the first and second phonemes are considered correct for that single segment.

For example, consider a training algorithm for a Supervised Competitive Learning neural network. In this neural network, an internal representation of a set of transformation vectors is maintained, (referred to as centroids), one centroid for each possible phoneme/vector set. A transform vector set from the training set is presented to the neural network which then calculates the Euclidean distance of the transformation vector to each of the centroids. The centroid closest (lowest Euclidean distance) to the transformation vector is deemed the correct centroid, and therefore the correct phoneme. This result is then compared to the user identified correct phoneme, stored with the transformation vector in the training set. If the neural network arrived at the same result, then the centroid is moved closer to the transformation vector. If the neural network arrived at a different result, then the centroid is moved farther away from the transformation vector. The method of moving centroids, either closer or farther away from transformation vectors, varies with the details of implementation, but in general, moving closer means reducing the Euclidean distance, whereas moving farther away increases the Euclidean distance. Also in general, the amount the centroids are moved is a decreasing function of time, whereby early in training centroids are moved more than later on in training, also referred to as annealing.

The difference during training when using the pairs method in this example is that a transformation vector in the training set has two possible, user-identified, correct phonemes. During training, the Supervised Competitive Learning neural network may assign either of these two centroids to the transformation vector.

Figure 5:
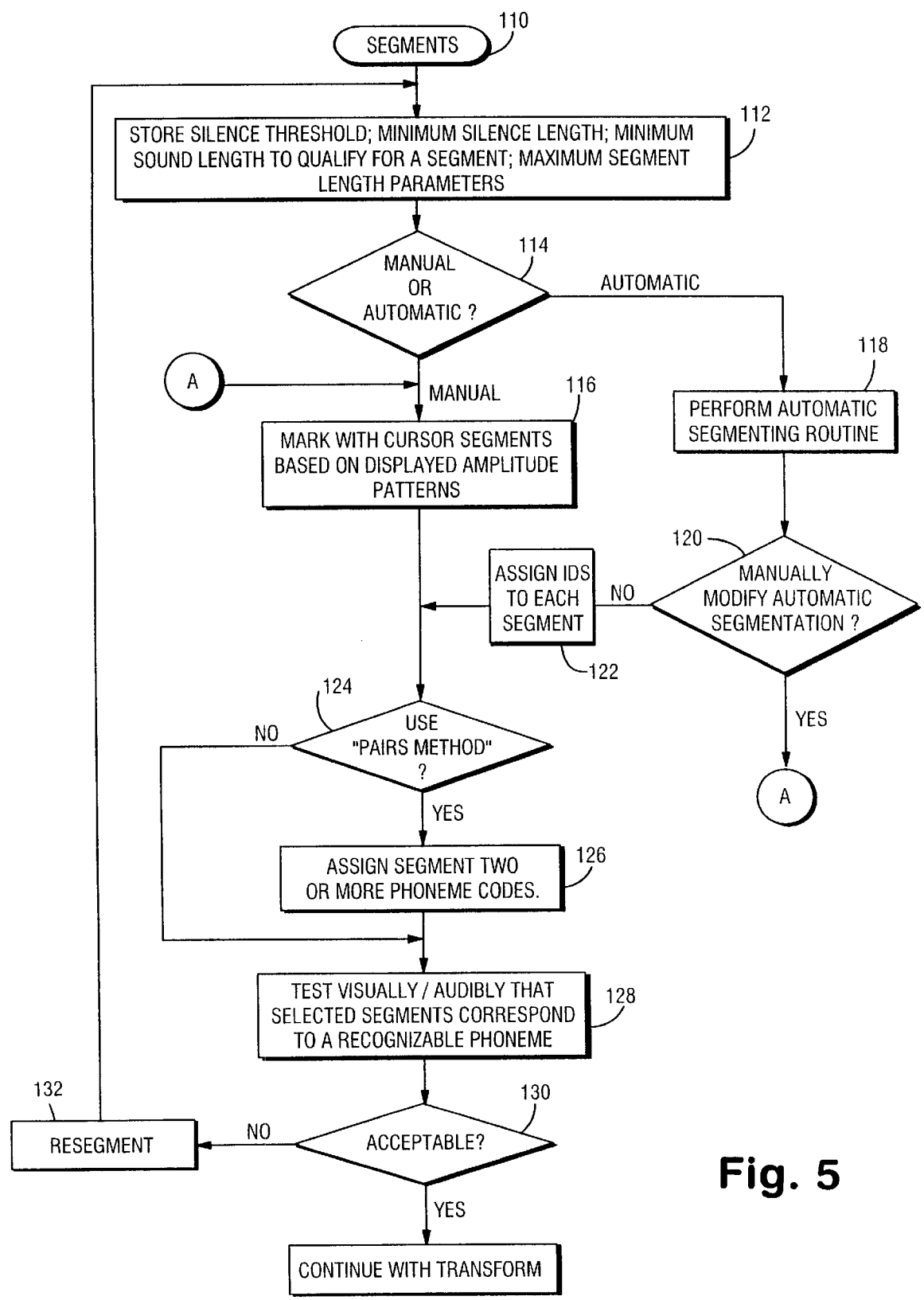
FIG. 5 is a flow chart illustrating speech segmenting procedures that may be used in accordance with the present invention.

A segmenting (block 110) flowchart routine is now described in conjunction with FIG. 5. An operator stores silence threshold, minimum silence length, minimum sound length to qualify for a segment, and maximum segment length parameters (block 112). A determination is made whether manual or automatic segmentation is selected by a user (block 114). For manual segmentation, a user marks with a cursor on the display screen segments based on displayed amplitude patterns (block 116). Otherwise, the automatic segmentation routine is performed (block 118). At the end of the automatic segmentation routine, a decision is made whether an operator desires to manually modify the automatic segmentation (block 120). If manual modification is required, control turns to block 116 via flag "A". Otherwise, control proceeds to block 122 where an operator assigns a corresponding phoneme ID or code if a supervised neural network is going to be used (block 122). A decision is then made whether the pairs method will be used (block 124) If so, the segment is assigned more than one phoneme code or ID by the operator (block 126). The operator may test visually and/or audibly that the selected segments correspond to a recognizable phoneme or a pair of phonemes (block 128). If visual and/or audible testing produces an unacceptable result, resegmenting is performed (block 132), and control proceeds back to block 112. Otherwise, the neural network development process continues with transformation of the phoneme segments.

Automatic segmentation referred to above, (e.g., block 84 in FIG. 2), is performed when the neural network developed with this invention is used in an automated phoneme recognition process. In an automated phoneme recognition process, a user typically does not determine the start and end points of segments, and therefore the start and end points of phonemes naturally occurring in speech. The automatic segmentation uses time and amplitude analysis of the digitized speech data to assign reasonable start and end points of phonemes as well as to eliminate silence gaps in the speech. Several possible algorithms can perform automatic speech segmentation.

For example, in the current embodiment of the invention, the user specifies four parameters controlling the automatic segmentation algorithm. These parameters are silence threshold, silence duration, minimum segment length, and maximum segment length. Silence threshold is an amplitude value used to determine if a digitized speech sample is silence or not. All speech samples with an amplitude less than the silence threshold are considered to be silence. The silence duration is the minimum duration in time that consecutive digitized speech samples, all of which are silence, must occur before that sequence of samples is considered a silence gap. If fewer consecutive samples occur, then the stretch of samples is not considered to be a silence gap. The minimum segment length is the minimum duration in time that must occur without silence gaps before a sequence of samples is considered a segment. This time value is usually the minimum amount of time that a phoneme is expected to take in the speech to be processed by the automated segmentation algorithm. The maximum segment length is the maximum duration in time that can occur without silence gaps and still be considered a single segment. This time value is usually the maximum amount of time that a phoneme is expected to take in the speech to be processed by the automated segmentation algorithm. The maximum segment length may also be the time constant of the word recognition algorithm (such as a Hidden Markov Model stochastic analysis method) to which the neural network phoneme recognition algorithm will provide a stream of phoneme codes.

In this example of the automatic segmentation algorithm, the four parameters described above are used when performing a single "pass" of the digitized speech samples. During this pass, the segmentation algorithm creates the largest possible non-overlapping segments out of the samples. All of the created segments satisfy the requirements specified by the parameters, e.g., not having any silence gaps included in segments, and having no segment length longer than a certain duration. Of course, other algorithms are possible, including those that allow overlapping segments, or those that consider more information than just time and amplitude.

Segments of digitized speech data, in common practice, undergo a transformation prior to presentation to the neural network. The transformation is usually into frequency domain (Fourier transform) or into a set of filter coefficients (Linear Predictive Coding transform) in order to remove phase information. For a neural network to identify a segment without transformation, it would have to be compared to a various known segments for given phonemes in an attempt to find a match. That comparison would require alignment of the peaks of the audio data with the peaks in the known segments. Such phase shifting of signals would be cumbersome and slow. Transformation out of the time domain can be used to eliminate this problem. For example, Fourier transformation of time varying signals into the frequency domain eliminates phase dependency in the audio signal being represented as the root-mean-squared (RMS) of SIN and COS waves. The phase independent RMS amplitudes at each frequency are then compared. In the present invention, the well known fast Fourier transform (FFT) may be used to effect this frequency based transformation. As will be describe in more detail below, other transformation techniques may also be used in the present invention.

The segmented audio signal is further divided into "frames" for FFT processing. Framing the segments is essentially the same as multiplying the signal by a rectangular signal whose start and end points correspond to the start and end points of the sample frame. Multiplication of a signal by a rectangular pulse equates to convolution in the frequency domain. The FFT of the rectangular pulse is similar to the SINC function in the continuous case. This function has rather large side-lobes, and results in a "leakage" distortion of the frequency spectrum of the original signal. Leakage causes frequencies concentrated at a single point in the spectrum, to be scattered over a band of frequencies, and may also cause smaller frequency components to be obliterated by a side lobe of a large neighboring frequency component.

To avoid this effect, a windowing function with smaller side lobes may be selected through a menu option during initialization of transformation parameters. One example and common window other than a rectangular window is the Hamming window, $(1+0.84(COS(2*\pi*n/N))$ when $|n|<=N/2$, 0 otherwise). Other windowing functions could also be used.

An operator selects frame window size. If the frame window is too large, then it may encompass a formant transition, and the transition will be lost being characterized by a single spectrum envelope. If the frame window is too small, then it may not contain the entire period T of an important low frequency component, and here too, information will be lost. Windows on the order of 20–25 msec are often good compromise values. The present invention also permits the use of overlapping frames. This allows the use of larger frames to capture low frequency information, while at the same time getting more spectrum envelopes in the same amount of time which improves the probability of capturing a formant transition. Overlap values for example on the order of 5–10 msec may be used.

An operator also selects the dimension of transform vectors. For example, the FFT algorithm generates the same number of spectral coefficients as amplitude values in a sample frame of digitized voice. Once the magnitude is determined for each of these spectral values, the FFT becomes symmetric. The frequency range is determined by the FFT window size. Since the magnitude of the SIN and COS components is an even function, only half of FFT's coefficients are considered in the frequency range. Therefore, half of the spectral coefficients contains all of the needed information reducing the dimension of the vector need to represent the speech segment in vector space. The vector dimension is reduced further by determining average power in spectral bands. Instead of taking spectral bands of equal size, the present invention uses pseudo-mel scale banding. The mel scale is modeled after the human cochlea and measures human sensitivity to frequency variation. Roughly it is linear below 1 KHz, and logarithmic above 1 KHz. The band size for each vector component determined by the pseudo-mel scale is calculated as follows:

$$mels=(1000/\log 2)*(\log(1+frequency/1000))$$

The first 75% of the vector elements are used to represent bands that divide the bottom 60% of the frequency range into equal parts (linear Hz scale). The last 25% of the components represent bands that divide the top 40% of the frequency range into equal parts. This pseudo-mel algorithm insures a higher resolution for the lower frequencies.

Thus, the FFT removes phase information by taking the RMS of SIN and COS values at each spectral band, and using this spectral power as a multiple dimension input vector for the neural network. This ensures consistency regardless of exact frame alignment.

Pitch may optionally be removed from the speech signal since it is not particularly helpful in identifying phonemes by twice Fourier transforming the speech to yield a cepstrum rather than the spectrum generated by a single Fourier transform. Again, pitch removal is selected via menu during transformation parameter initialization.

To remove pitch, a second FFT is performed on the natural logarithm of the magnitude of the results of the first FFT yielding a cepstrum (instead of a spectrum). The cepstrum exhibits the pitch and its many harmonics as a single spike separated from those of the spectrum envelope of the formants. This spike is removed using a rectangular low pass filter (sometimes called a "lifter," because it is used on the cepstrum and not the spectrum), and the natural exponent of the resultant values are reverse Fourier transformed to provide pitch free spectrum envelope.

Another transformation method that can be selected by an operator to transform speech segments into multidimension vector sets is the linear predictive coding (LPC) or "all-poles" transformation method. The LPC method is based on a model of the vocal tract that inherently ignores the pitch of the speaker and instead is characterized by the formant frequencies. The vocal tract is modeled by a series of connected cylinders each having an acoustical impedance $Rn=$(air density)(propagation velocity)/(cross sectional area), where only the cross sectional area is variable with the size of the cylinder. The reflection coefficient at the junction of two cylinders is $k=(R1-R2)/(R1+R2)$. The delay of the waves traveling from one end of cylinder to the other is lag=(Length of cylinder)/(propagation velocity). The entire system is sampled at (2* lag) to make the model a lumped parameter system and Z-transformed to calculate the transformation matrix for individual cylinders and the transformation matrix of the entire vocal tract (i.e., the product of the individual transformation matrices).

The LPC algorithm is an economical way of calculating the transfer function as an all pole function. Accordingly, the poles, corresponding to the poles of the LPC estimate of the vocal tract filter, are the components of an LPC vector used to classify speech features in each speech segment.

Figure 6:
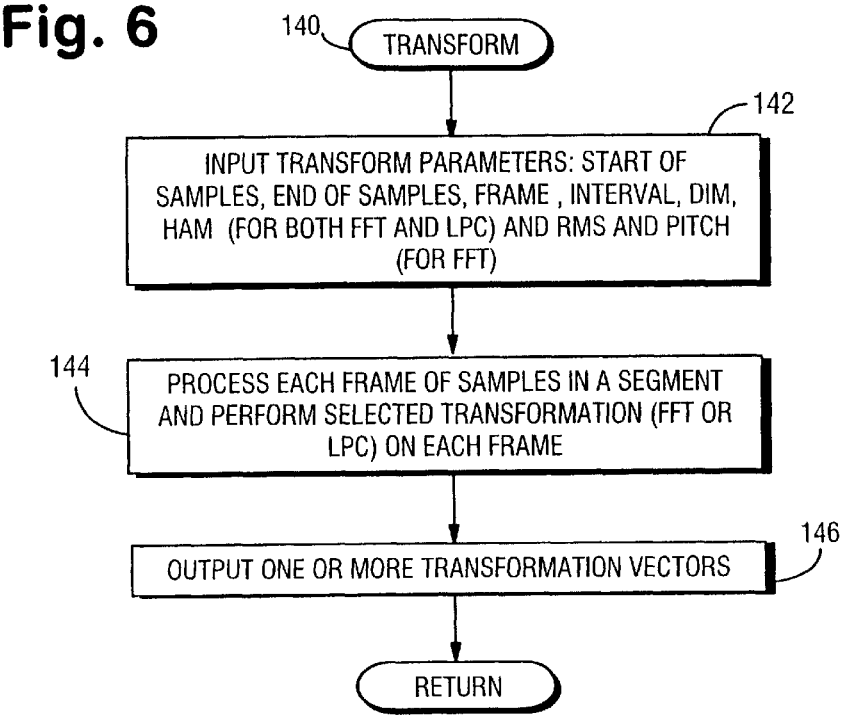
FIG. 6 is a flow chart diagram describing the segment transformation procedure.

The user selects a transformation method and corresponding parameters. A flowchart describing a segment transform process (block 140) generally is now described in conjunction with FIG. 6. A user inputs various transform of parameters including startup samples, end of samples, frame, interval, dimension, windowing, and for a fast Fourier transform, RMS and pitch options (block 142). Each frame of samples in a segment is transformed in accordance with the selected transformation method and parameters (block 144). One or more transformation vectors per segment/vector set is then output and displayed in block 146.

The user enters four parameters associated with any transform type:

Window: a Hamming window or a Rectangular window.

Number of Samples per Frame—for the FFT, this must be a power of two.

Samples Between Frames—this number is less than or equal to the number of samples per frame and allows overlap of samples between frames. For example, if a frame is to be taken every 5 ms and the audio sampling rate is 11,025 bps, then this value should be set to 55.

Resultant Dimension—the number of elements or dimensions in each transform vector. For FFT, the first element is the average power of frame values. For LPC, the first element is average power and the last element is error.

The user selects two other optional parameters for the FFT transform. If the "COS Only" option is selected, then the FFT transform discards the imaginary portion (SIN) of the resultant transform before dimension reduction If "Magnitude" is chosen, the FFT takes the square root of the sum of the squares of each of the real and imaginary components of the resultant transform, before performing dimension reduction. Using the "Pitch Filter" menu option, the FFT algorithm performs a second Fourier transform to remove the speaker's pitch from the frequency analysis.

Figure 7:
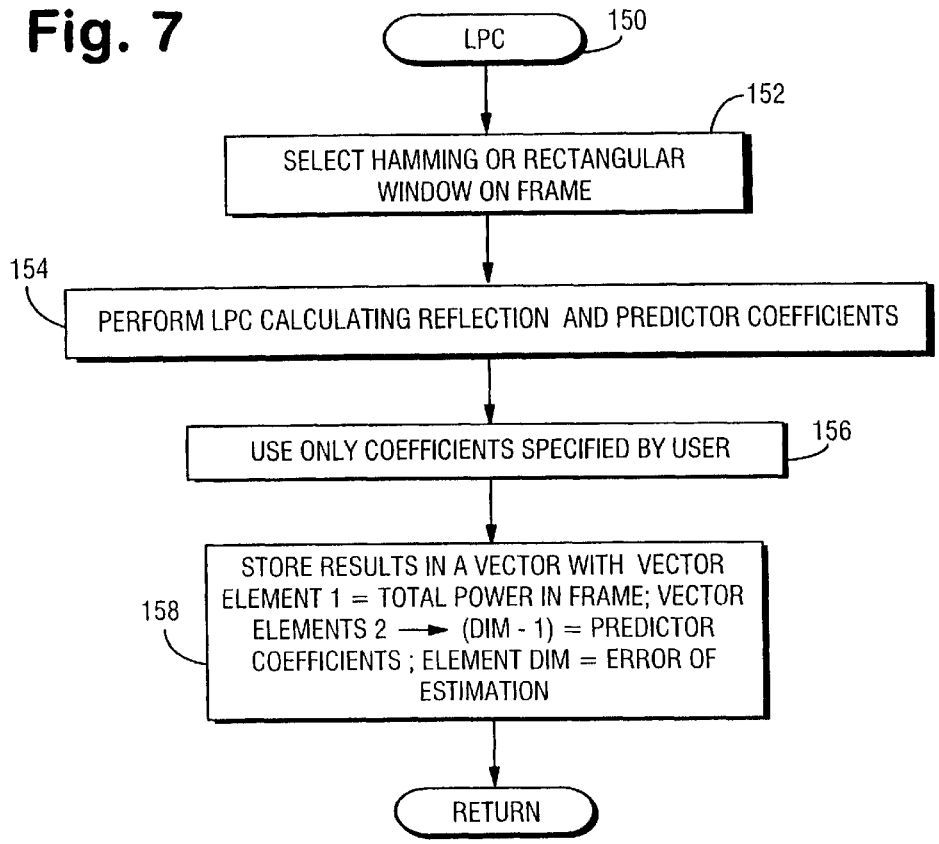
FIG. 7 is a flow chart diagram describing the linear predictive coding transformation procedure.

A flowchart illustrating the LPC transformation process (block 150) is now described in conjunction with FIG. 7. The particular type of window (Hamming or rectangular) is selected by an operator (block 152), and the LPC algorithm is performed calculating the appropriate reflection and predictor coefficients (block 154). As indicated in block 156, only those coefficients specified by the operator are used. The LPC results are stored as a multidimensional vector (block 158). Vector element 1 corresponds to the total power in the segment frame. Vector elements 2 through the next to last element correspond to the predictor coefficients. The final dimension vector element corresponds to the error of estimation.

Figure 8:
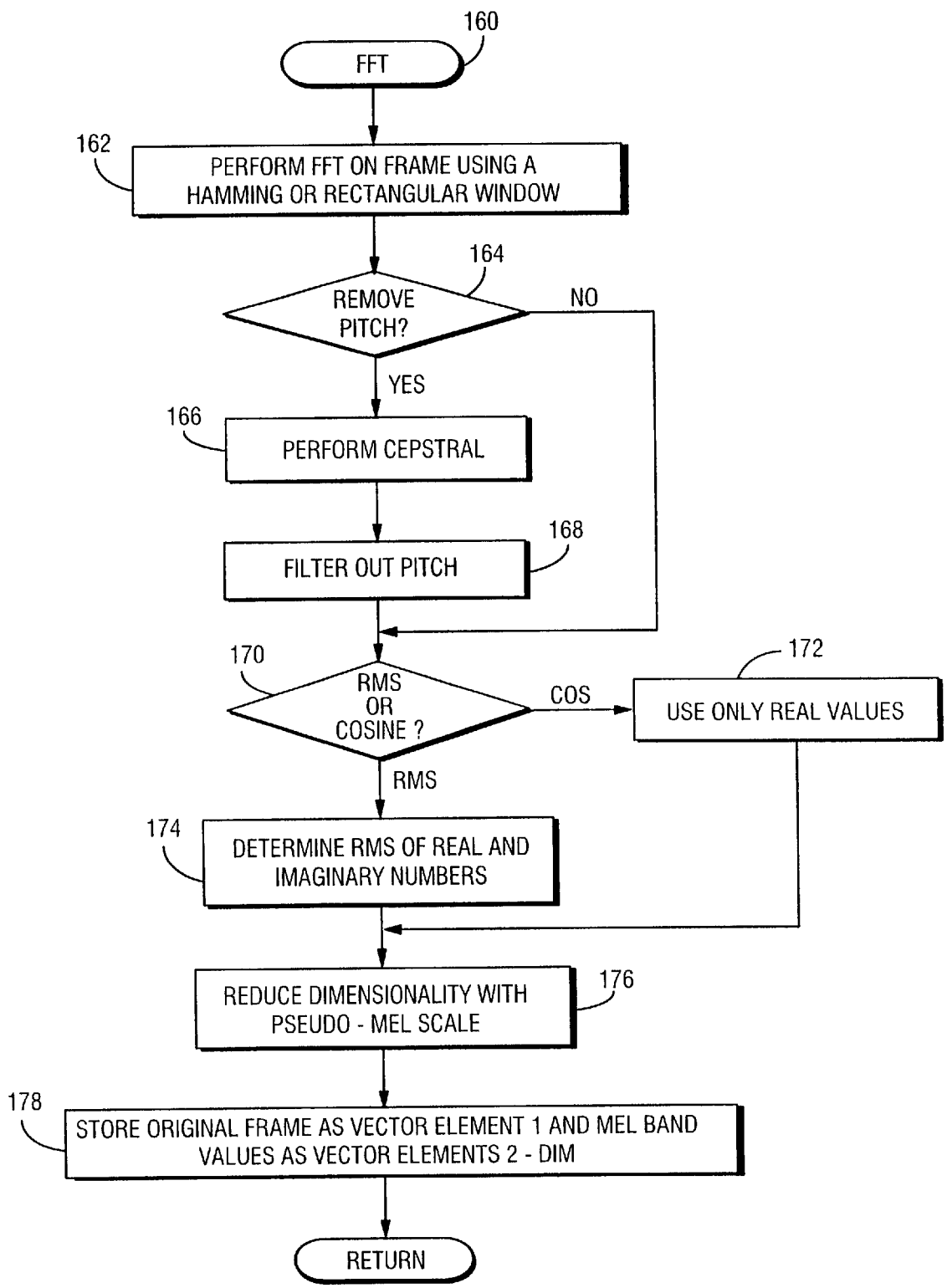
FIG. 8 is a flow chart diagram describing the fast Fourier transform procedure.

The fast Fourier transformation process (block 160) is now described in conjunction with the flow chart shown in FIG. 8. Each frame of segmented speech is processed using the fast Fourier transform (FFT) along with the Hamming or rectangular window selected by the operator (block 162). If pitch removal is selected by an operator (block 164), a cepstral operation is additionally performed on the output of the fast Fourier transform (block 166). The cepstral output is filtered to remove pitch (block 168). A decision is made in block 170 whether to use the root mean squared (RMS) or cosine (COS) only values of the FFT output (block 170). RMS values of the FFT complex numbers are determined (block 174), otherwise the real or cosine only value of the FFT output are selected (block 172). The dimensionality of the vector output is further reduced by applying the pseudo-mel scale (block 176). The original frame is stored as vector element 1 along with the pseudo-mel band values which representing the power spectrum of the segment as vector elements 2 through or (block 178).

After the speech signal is segmented and transformed into a vector set of one or more multi-dimension vectors, e.g., using FFT or LPC, the vector set is presented one vector at a time to the neural network to train the neural network which is essentially a pattern recognizer. The neural network tries to determine which phoneme each vector represents. Assuming only one type of vector is present in a segment/vector set (there typically being plural vectors per segment), each segment vector is identified using a code corresponding to that phoneme. Both the vector and its corresponding phoneme code are stored as a part of the neural network's training. Once the neural network is trained, it is used to assign a phoneme code to speech segments presented during testing. If a speech segment contains more than one vector, then the most frequent or popular phoneme code assigned to all vectors in the segment/vector set is selected as being the phoneme code for the entire segment.

The present invention permits selection of a plurality of different neural networks (implemented using software programs) which can be trained to recognize phonemes. Some examples include Unsupervised Competitive Learning (UCL) Auto-Associative Back Propagation Network (Auto-Assoc.), Supervised Competitive Learning (SCL), and Hetero-Associative Back Propagation Network (Backprop.) In general, a neural network algorithm assigns an input multi-dimension vector corresponding to a segment of speech to one of a set of phoneme codes. As the dimension of the input vectors and the number of output codes increases, more data processing resources are required. The following is a brief description of several example neural networks that may be used with the present invention.

Unsupervised Competitive Learning (UCL) or Adaptive Vector Quantization adaptively determines an exemplary multi-dimension vector that most closely represents an actual centroid of a vector space of all the phoneme vectors in the current training set corresponding to a particular phoneme. In other words, that centroid is the UCL neural network's belief of what the ideal vector corresponding to a particular phoneme code looks like in multidimension vector space. Each centroid therefore corresponds to or has a very high probability of corresponding to a known phoneme code.

In operation, each randomly presented training vector corresponding to some as yet undetermined phoneme is compared by the neural network to each of the centroids. The centroid having the smallest distance, i.e. nearest or closest to the training vector, is selected to code that vector. The selected centroid is modified following a difference learning rule. Each component of the selected centroid having N different dimensions in space N_dim) is moved closer to the corresponding training vector (T_dim) using the formula:

$$N\_dim = N\_dim + training\_rate * (T\_dim - N\_{dim}).$$

The training rate is slowly lowered over successive examples according to a table of training rate decay. The process is then repeated thereby "training" the neural network to recognize the vector corresponding to a particular speech phoneme.

As one example, the following table of training rate decay values may be used:

| # Of Times Entire Training Set Presented | Training Rate |
| --- | --- |
| 0–100 | 0.5 |
| 101–200 | 0.1 |
| 201–300 | 0.05 |
| 301–1000 | 0.01 |
| 1001–2000 | 0.0075 |
| 2001–3000 | 0.002 |
| 3001 and above | 0.001 |

Once trained, the UCL neural network codes speech segments following this same basic procedure. The nearest centroid (measured by Euclidean distance) to the input vector is the winning centroid, and therefore, the winning or selected phoneme identification code.

A Supervised Competitive Learning (SCL) neural network is a supervised training complement to UCL. All of the processing for SCL is the same as for UCL, except for the modification of the components during training. If the selected centroid for a speech segment has the same phoneme code as that previously assigned to the segment by the user, then the vector elements of the centroid are modified as for UCL. Similarly, if the user ambiguously identifies the vector, then the centroid is assumed to be the same phoneme code if it is the same as any of the phoneme codes assigned by the user to the training vector. On the other hand, if the centroid is not the "correct" phoneme code, then the centroid moves away from the training vector. The components of the centroid are modified as follows:

$$N\_dim = N\_dim - [(training\_rate/number\ of\ codes) * (T\_dim - N\_dim)].$$

In this way, the centroids are brought closer only to the regions of the phoneme codes they are to represent and moved away from other phoneme code regions.

The back propagation algorithm (BP) neural network is different from the UCL and SCL algorithms both in its method of operation and the definition of a neuron in the system. Back propagation is more similar to a biological neuron having several inputs (dendrites from other neurons), where each input is scaled by a weight multiplier (dendrite to axon synapse). Each neuron has a single state that is a non-linear, bounded, monotonically increasing function of the inputs scaled by the corresponding weights (axon firing rate).

Multiple, e.g. three, layers of neurons operate in a feed-forward fashion during coding. The input layer neurons have activation states set to the input vector's component values so there are as many input neurons as elements in the input vector. The middle layer(s), or the hidden layer(s), has (have) typically as many neurons as there are phoneme codes. Each neuron of the hidden layer receives an input from each neuron in the input layer as well as input from a bias neuron whose activation level is always 0.8. These hidden layer inputs are scaled by assigned numerical weights. The activation level of the hidden neurons is then modified by a transfer function. The output layer has as many neurons as there are phoneme identification codes. Output neurons receive weighted inputs from each of the hidden layer neurons and from the bias neuron. Output neurons activation levels are also modified by the transfer function.

During phoneme coding, each BP neuron operates as follows. First, the weighted sum of inputs is calculated, and the sum is modified by a sigmoid transfer function:

activation=$\Sigma$(sum), where $\Sigma(x)=1/(1+e^{-x})$

This process proceeds in a feed forward manner, where first the input neuron levels are set by the input vector, the hidden layer activation levels are calculated, and the output layer activation levels are calculated. During coding, the output neuron with the highest activation level is the "winning" or selected phoneme identification code.

During training, an additional backward pass follows the above procedure to modify the connection weights. First, for each of the output neurons, the error at the neuron is calculated as the correct output of the neuron minus its actual activation state. For example, the correct output is 0.8 if the neuron is the code of the training sample; otherwise, the correct output is 0.2. The error is scaled by the derivative of the sigmoid function at the weighted input value of the output neuron in question. Once the error for each of the output neurons is calculated, the weights to these neurons are modified. Each weight is modified by an amount equal to the error times the state of the neuron connected by that weight (in the hidden layer) times the training_scale (which decays according to the same table as for UCL).

The hidden layer neurons also modify their weights (coming in from the input layer) in similar fashion except that during neural network training, the error at the neuron is not explicitly known. Instead, the error is "back-propagated" from the output layer. The error at a hidden layer neuron is equal to the sum of the errors at the output neurons, each scaled by the connection weight from the hidden neuron to the output neuron. This sum of errors is then scaled by the derivative of the sigmoid and evaluated at the weighted sum of inputs to that hidden neuron.

In this way, a back propagation neural network learns to output the correct code for an input vector. In the integrated user interface of the present invention, the error of the output layer and the activation levels of the output neurons are displayed.

The auto-associative neural network processes inputs and is trained in much the same way as the back propagation neural network. The two vary, however, in network topology and the training values for the network. First, the output layer has as many neurons as there are components in the input vector. The correct states of the output layer are the same as the states of the input layer. The neural network is being trained to recreate the input vector. The number of hidden neurons is still equal to the number of codes.

It is possible to calculate the states of the output neurons knowing only the states of the hidden layer neurons (and the bias neuron). If the neural network has no error, then the dimension of the input vector has been reduced to the number of codes.

When calculating the states of the hidden layer, prior to back-propagation, only the neuron in the hidden layer with the highest activation level is allowed to keep that activation level. All other neurons in the hidden layer are set to 0. When used for coding, the hidden layer neuron whose activation level is highest, is the winning, selected code. Feed forward computation in the auto-association neural network need not proceed to the output layer during coding (non-training) iterations.

Figure 9:
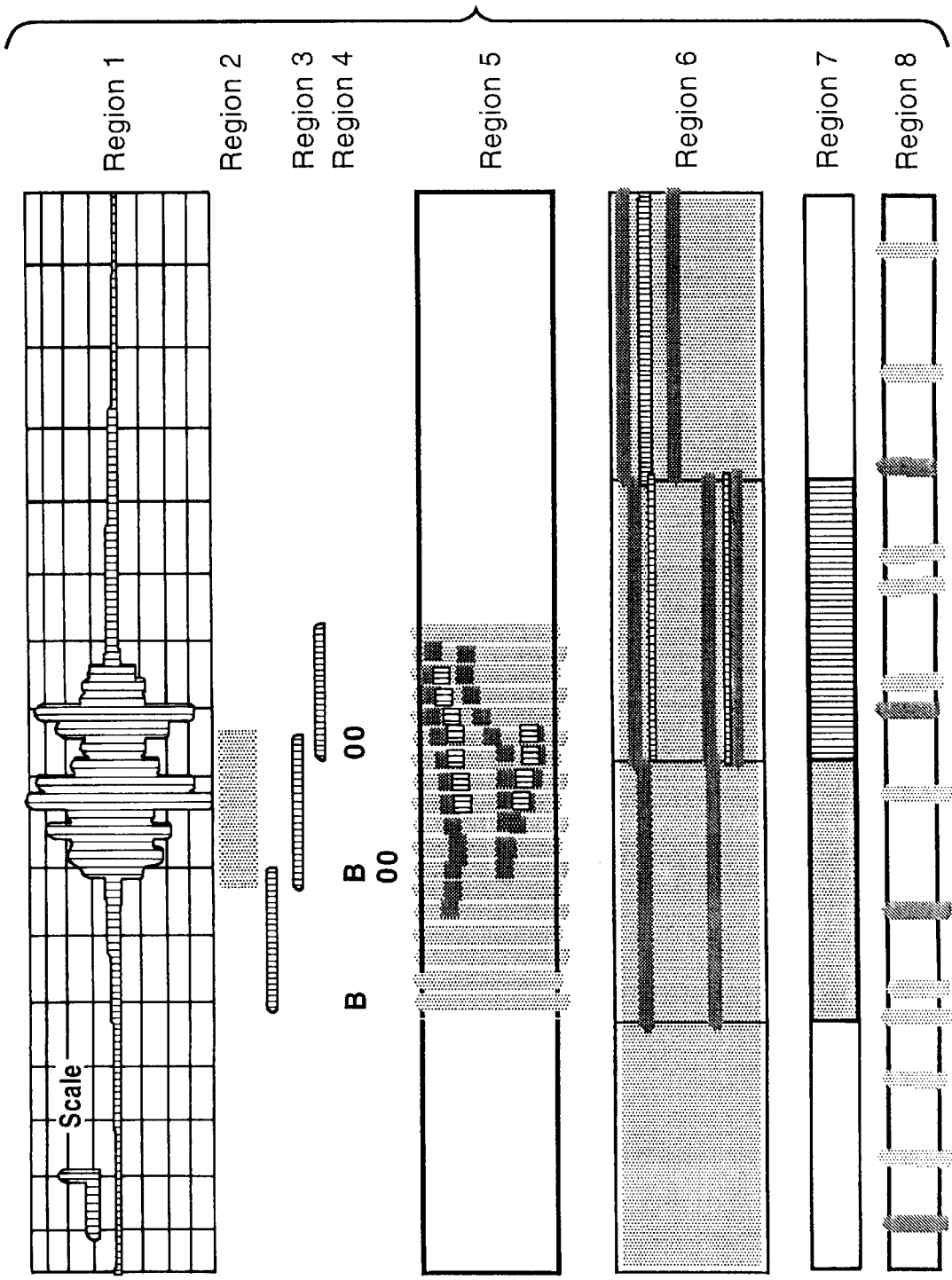
FIG. 9 is a visualization display screen produced to assist an operator in developing a neural network for phoneme recognition.

The integrated user interface in the present invention preferably conforms to Windows standards although this is not necessary to implement the present invention. A mouse and/or keyboard are used for selection/data entry in conjunction with a display. A Menu Bar allows access to most of the program's operations. Menu items appear hierarchically with sub-menu selections as follows:

File
    Information Archival
    Configuration Display
    Voice File Load
    SOUNDREC.EXE
    Exit
Segment
    Segmentation Rules
Identify
    ID Segment
    Number of ID's
    Use Pairs Method
    Next Segment
    Save Segments for Training
Transform
    Transform Method
    Transform Dimension
    Windowing Method
    Magnitude or COS only
    Pitch Filter or Not
Untransform
    Untransform and Play
Code
    Code On/Off
    Train One Pass
    UCL
    Auto-assoc. neural network
    SCL
    Backprop
Decode
    Decode and Play
Display (Allows customization of data visualization)
    Resize
    Color
    Font
    Suspend/Resume Visualization
    Refresh Screen
    Black and White Visualization
    Help FIG. 9 illustrates the visualization window used in developing and testing a neural network. The window is divided into 8 regions identified as "bars" because each region resembles a rectangular region or bar in the visualization display window:

(1) Voice Data Bar
(2) Current Segment Bar
(3) Segments Bar
(4) Identification Bar
(5) Transform Bar
(6) Coding Bar
(7) Winning Code Bar
(8) Random Distribution Bar Different colors are preferably used to distinguish the bars and accompanying display data. The input digitized speech data waveform currently under inspection is displayed in a first region of the display. The vertical position of the signal in the matrix represents amplitude, and the horizontal position represents the signal's position in time. The data is preferably scaled and appears over graph scale lines. A graph key in one area of the first display region describes the dimensions of the matrix. For example, the display may be scaled so that each horizontal incremental division of the matrix represents 1000 bytes of digitized voice data. Assuming an 8-bit resolution digitization scheme, the vertical amplitude scale has 255 total divisions or 127 divisions above and below DC.

The symmetric presentation of amplitude about the horizontal DC axis improves visualization and identification of amplitude values. The sampling rate used during audio digitization will determine the number of bytes per second. Therefore 1000 bytes of data may represent different amounts of time (91 ms at 11K bps, 45 ms at 22K bps, and 23 ms at 44K bps).

The digitized speech is divided into segments (1) to disregard non-speech information, e.g. silence, and (2) to classify phonemes. Thus, segments are markers that delimit start and end points of potential phonemes to permit extraction of pertinent audio information. Manual addition and deletion of segments is accomplished using the mouse and display cursor.

A second display region (beneath the first region) indicates, e.g., by highlighting, color, etc., which segment is the "current" segment. For example, the current segment may be indicated by a highlight colored rectangle extending the length of the segment. The position of the rectangle corresponds to and is directly below and aligned with the current segment.

In a third display region (beneath the second display) region, each segment of voice data is designated as a horizontal colored/highlighted stripe. The vertical position of the stripe is varied automatically for ease of visibility in distinguishing the segments. The horizontal position and width correspond directly to the audio voice data contained within the segment which is displayed directly above in the first display region.

A fourth display region (beneath the third region) shows an identification (ID) for each of the segments. Segment identification may be performed manually by the user or automatically. Each ID includes a number and an optional alphabetic string label. The alphanumeric string may correspond in a training to the known phoneme sound that the segment represents, e.g., the sound "oo" as in the word "food."

A fifth display region beneath the fourth region displays the set of vector transformations corresponding to each speech segment. The horizontal position and width of the transform vector data corresponds to the speech segment transformed The vertical height of the transform data is defined by a user selected visualization scale. Each vector set corresponding to a segment of speech is displayed as a series of adjacent vertical columns. Each individual vector column includes a series of adjacent blocks, each block representing a vector dimension. Therefore, the size and number of blocks depend on the total number of vector dimensions. The width of the column or "stripe" depends on a transformation frame size and interval selected by the operator The transformation vector dimension values are visually represented using for example color and/or brightness. For example, black indicates a zero or near zero magnitude value, red indicates a positive magnitude value, and blue indicates a negative magnitude value where brightness indicates relative magnitude.

An operator can detect visually if a vector set corresponding to a speech segment includes one or more phonemes. A single phoneme is present when the horizontal rows of blocks in the adjacent vectors in the set approximate a straight, horizontal line. If the rows follow curving, non-horizontal lines, more than one phoneme may be present.

For a Fourier transformation, the first vector block (topmost component of the displayed vector) represents the average power of the transformation window. The other vector blocks are scaled to a fixed RMS. Frequencies represented by the components are depicted by their vertical position in the displayed vector from a second block (low frequency) to a bottom most block (high frequency). Preferably, the pseudo-mel scale (modelled after the human ear) is used to reduce the number of dimensions transformed and to provide a higher resolution for lower frequencies than for the higher frequencies. Therefore, vector dimensions appearing towards the bottom of the vector represent a larger band of frequencies than those displayed on top.

When using an LPC transformation, the topmost displayed block is the average power of the transformed audio window and the bottom most block shows an error of the LPC estimation. The other blocks represent amplitude values of a time delay feedback system that most closely approximates the speech sample. The second block below the average power block is the gain of the single time quanta delay feedback element. The third block is the gain of two time unit feedback, and so forth. The gain amplitude is displayed in one colored for positive, and another color for negative values, with brightness representing relative amplitude.

A sixth display region (beneath the fifth region) shows the estimated exemplary phoneme vectors corresponding to the audio data. These exemplary vectors may be the centroids of a Euclidean distance neural network classifier (UCL and SCL methods) or they may be estimations of centroids used by the Neural Network to perform classification (Auto-associative and Backpropagation methods).

A significant advantage of the present invention is that the estimate exemplary phoneme vectors look similar to the transformation vectors that the neural network seeks to classify/code. Specifically, the pattern of horizontal rows of blocks in the transform vectors for each speech segment are paralleled in the corresponding centroid vector. This allows a user to visually evaluate and confirm the validity of the centroids or estimated centroids selected by the neural network.

A seventh display region (beneath the sixth region) shows the number of times a particular phoneme code was selected (1) as a result of the neural network's analysis of a speech segment during normal speech recognition or (2) during the last training pass of the neural network when the neural network is being trained using a known set of phonemes. In the first case, this number permits visual confirmation why a specific segment was classified as the "winning" or "most popular" phoneme code for each vector set. In the second case, the number alerts the user when a degenerate situation has arisen, e.g., one code is winning too often during a training pass.

One way of displaying this qualitatively (rather that just display number of times selected number) is with different rectangles positioned under each displayed centroid code (each centroid could also be a different color). The number of times a centroid code wins is indicated by brightness. The information is automatically scaled according to the number of samples presented. For linear scaling, some rectangles will appear as black, indicating that the code has hardly ever "won" or been selected.

An eighth display region (beneath the seventh region) shows the number of times a given centroid code randomly selected from the training set of phoneme codes occurred during the last training pass. This permits a visual recognition of a degenerate situation where the neural network randomization scheme has failed. For example, the bar is black with green rectangles showing number of occurrences. The horizontal position of the rectangle shows the linear position of the sample within the training set. The brightness of the green shows the relative frequency of that sample during the last training pass. The size of the black region depends upon the way the training set was created, including the ratio of the size of the average segment over the number of segments used to create the set. If the black areas always appear in the same places, a degenerate situation does not exist.

If a supervised neural network learning scheme is in use, the randomness bar is divided into sections whose width and positions correspond to the phoneme codes in the coding data bar. The number of times each code ID is presented appears as the brightness of the green region. In this way, the user confirms that the random presentation scheme is indeed presenting the various IDs (corresponding to different phoneme vectors) with the same probability as their probability in the training set.

Figure 10:
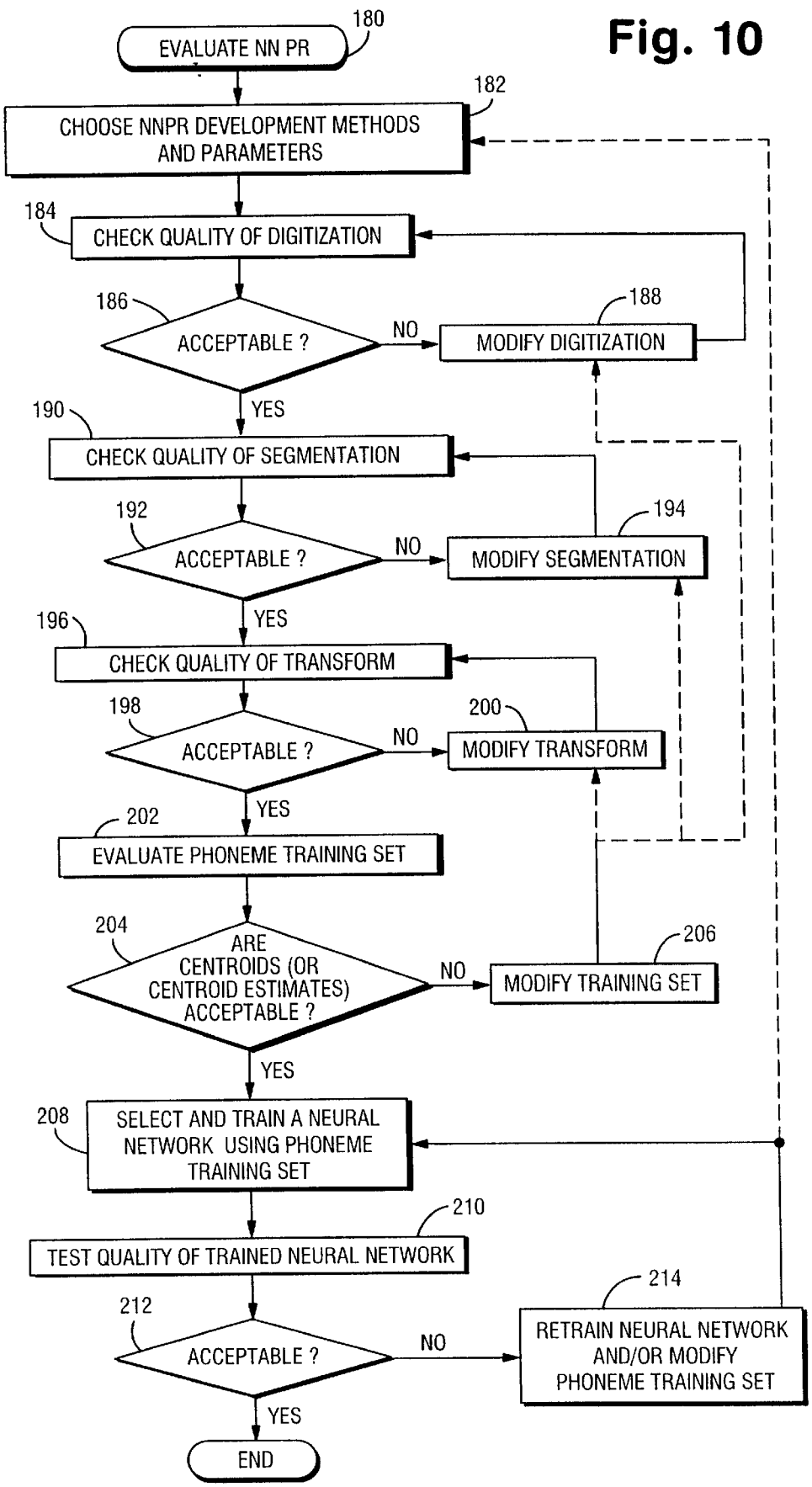
FIG. 10 is a flow chart diagram describing how an operator may determine qualitatively the performance of the developed neural network.

The flow chart of FIG. 10 illustrates how the present invention permits a user to evaluate the neural network developed for phoneme recognition (block 180). Initially, the operator chooses the various development methods and parameters used to develop a neural network for phoneme recognition (block 182). At each step of the development, the quality of that particular step and its impact on the development process can be evaluated. For example, the quality of the digitization of the speech signal is checked (block 184). If it is unacceptable (block 186), the digitization technique and/or parameters may be modified (block 188). The quality of segmentation of the digitized speech may be checked (block 190). If it is not acceptable (block 192), the segmentation may be modified (block 194). The quality of the transformation process and the resulting transformation vectors can be evaluated both audibly and visually (block 196). If the transform vector set is unacceptable, the transformation parameters can be modified (block 200). The phoneme training set which is ultimately developed (block 202), the decision is made (block 204) whether the centroids or centroid estimates are acceptable. If not, the training set is modified (block 206) including modifying one or more of the transform, segmentation, and digitization processes. A neural network is selected and trained using the acceptable phoneme training set (block 208). The quality of the trained neural network is tested (block 210). If it is unacceptable (block 212), the neural network is retrained and/or the phoneme training set is modified (block 214).

In the evaluation process, it has already been described how the user may replay the digitized audio signal and the segments to determine audibly if they correspond to the actual input phoneme. If a digitized signal with the phonemes "oo", "aa", and "ee" is input, the user can listen to ensure those phonemes can be understood. In addition, vector sets corresponding to a segment/phoneme may be reverse Fourier transformed and should yield when audibly reproduced the corresponding. Recreation of a signal using LPC coefficients should also yield the original speech signal, assuming there are enough poles to describe the signal. However, several factors affecting the FFT and LPC algorithms, may greatly affect the regeneratability of the original speech signal from the resultant transform vectors. One factor is the dimension reduction for the FFT transform or the selection of fewer poles with the LPC transform. If the user selects a low dimension vector, then less data of the original speech signal is retained.

Other factors include the use of "Magnitude" to remove phase information in FFT transforms and the windowing function. Phase information is valuable in speech recognition. While a Hamming window may yield a cleaner transform, it may squelch high amplitude portions of the speech at the beginning and end of a frame. The LPC reverse transform is an estimation, because in this transformation, the original pitch of the speaker is not stored as a part of the LPC vector. Therefore, an arbitrary pitch is selected during signal reconstruction.

Nevertheless, a valuable qualitative evaluation of the information content of the resultant transform vectors can be made by performing the reverse transformation on the vector set and listening to the results. The user selects the Untransform menu item to cause each of the segments to be played back as a reconstructed signal. All of the segments are played back, one by one. The user verifies that there is enough difference in sounds of the reconstructed signals to distinguish them, especially when the signals belong to different phoneme classes.

The present invention recognizes that if a human (human being expert voice recognizers in languages that they are fluent) cannot distinguish between allegedly different sounds, then it is unlikely that the neural network will be able to distinguish and properly classify different sounds. If this is the case, the user should consider modifying the development using more elements (a larger dimension) in the transformation vectors.

Figure 11:
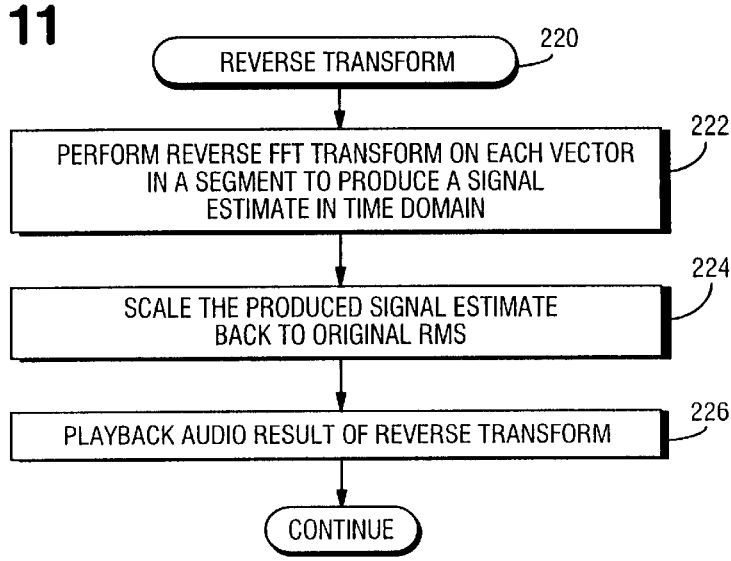
FIG. 11 is a flow chart diagram of the reverse transform procedure.

FIG. 11 illustrates a flowchart corresponding to the reverse transform procedure (block 220) used when the fast Fourier transformation method is used to transform this phoneme segments. A reverse fast Fourier transform is performed on each vector in a vector set corresponding to a phoneme segment to produce a time varying signal (block 222). The time varying signal estimate is scaled back to an original RMS value (block 224), and the resulting audio signal is played back via speaker (block 226).

As described above, there are basically two classes of neural network coding: unsupervised and supervised. These two classes refer to the way the training data is presented to the neural network and to the architecture and learning algorithms of the neural network. Once a training set of phonemes is created and saved, training of the selected neural network is initiated by selecting a training menu item which presents the entire phoneme training set in random order to the neural network, multiple time, e.g., 50 times. More difficult phoneme classification problems may require more than one such "training pass." After each training pass, the trained neural network is saved into disk memory.

A user may then evaluate the quality of the neural network developed for phoneme recognition by presenting during a test operation a test speech signal for classification into a series of phoneme codes by the neural network. Speech segments corresponding to different phonemes are classified differently and segments corresponding to the same phoneme are similarly classified. The UCL, SCL, and auto-associative neural networks determine centroids in n-dimensional vector space such that each centroid represents one class/code of speech samples corresponding to a single phoneme. The resulting centroid vectors are displayed for inspection and should look like the transform vectors of the phonemes from the test speech signal. Because a trained back propagation neural network does not generate centroid vectors per se, centroids are estimated in the present invention by examining the neural network's weight connections to determine which vector components are most important to a specific code result. After training, the estimated centroid vectors are displayed for inspection and should look like the transform vectors of the phonemes from the test speech signal.

Just as a speech segment's transform vector(s) may be reverse transformed used to reconstruct an audible speech signal, the centroid vectors may decoded used to reconstruct corresponding audio signals. By using a "Decode" menu option, the present invention reconstructs the audio signal represented by the centroid vectors. In essence, the decoding operation generates, for a given neural network and a phoneme code, an exemplary or centroid vector that if presented to that neural network would yield that code. Each centroid vector is then the reverse transformed, and played back as an audio signal to the user. Thus, a user determines from these centroids if speech can be reconstructed from phoneme codes. Moreover, the user may qualitatively measure whether the centroids accurately represent actual phonemes. The user can hear only differences between the audio samples and the centroid, and confirm that a human can identify the sounds as being the phonemes they represent.

Figure 12:
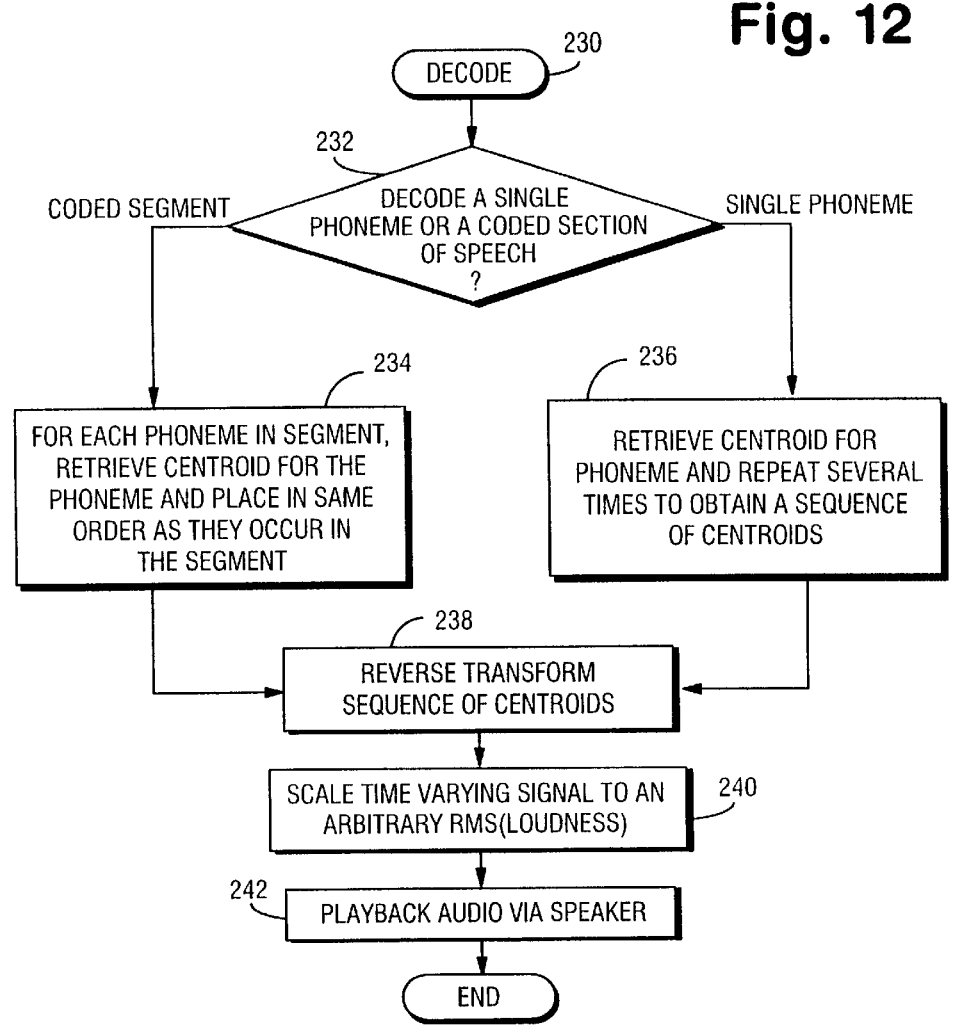
FIG. 12 is a flow chart of decoding procedures.

FIG. 12 illustrates a decode flowchart (block 230) corresponding to the decoding procedure used when the Supervised Competitive Learning (SCL) method is used as the neural network algorithm. If a single code is to be decoded (block 232), then the centroid for that code is repeated several times in a row, creating a sequence of centroids (block 236). If an entire segment of speech is to be decoded (block 232), then the centroids of the codes for each transformation vector in the segment are placed in the same order as they occur in the segment (block 234), creating a sequence of centroids. In either case, the sequence of centroids then undergoes a reverse transformation to produce a time varying signal (block 238). The time varying signal estimate is scaled back to an arbitrary RMS value (block 240), and the resulting audio signal is played back via speaker (block 242).

A number of specific options and/or applications may be desired for the present invention. For example, data processing could be made more hardware intensive and faster through the use of popular DSP chips designed specifically for the numerous floating point operations required for FFT and LPC calculations. Processing time could be reduced through the use of parallel processing of the neurons in each layer where each unit in a layer has access to the same information about the preceding layer (coding) or about total error in the next layer (training).

More expert knowledge could be included into the neural network by adding more dimensions to the vectors. Additional dimension elements could be for example a pitch frequency element that might be useful to differentiate between male and female speakers. Naturally, as vector elements are added, the neural network grows in size and slows down.

To be used as a full service speech recognition system, a parsing mechanism is employed to group phonemes into words for an isolated word recognition scheme. For example, the popular hidden markov model (HMM) algorithm could be used which compares the sequence of phoneme codes to an internal vocabulary of words with each word corresponding to a unique set of phonemes to recognize actual words of speech. The HMM algorithm may be trained with pre-classified speech samples just like the neural network is trained to recognize phonemes. Therefore, the neural network would be trained first, and then used to code phonemes. These phoneme codes would then be used to train the HMM to recognize words or phrases.

While the present invention has been described in connection with what is presently believed to be the most practical and preferred embodiment, it is to be understood that the invention is not to be limited to the disclosed embodiment. On the contrary, the invention is intended to cover various modifications and the equivalent arrangements included within the spirit and scope of the appended claims.

What is claimed is:

1. A method for training a neural network comprising the steps of:
   inputting an audio signal including a training set of phonemes;
   dividing the signal into segments, each segment representing a phoneme;
   identifying each segment;
   transforming segments into time independent vectors;
   verifying that at least one of the segments or vectors represents to a degree acceptable to an operator a corresponding one of the training set of phonemes; and
   training the neural network using the time independent vectors.

2. The method according to claim 1, wherein the trained neural network generates a centroid or a centroid estimate for each phoneme based on corresponding vectors.

3. The method according to claim 2, further comprising:
   displaying the audio signal, segments, vectors, and centroids or centroid estimates, wherein the operator visually confirms the acceptability of any one of the segments, vectors, and centroids or centroid estimates based on a degree of visual similarity between any combination of corresponding portions of the displayed audio signal, segments, vectors, or centroids/centroid estimates.

4. The method according to claim 2, further comprising:
   selectively reproducing a sound corresponding to one of the audio signal, segments, vectors, and centroids or centroid estimates to audibly confirm the acceptability of any one of the segments, vectors, and centroids or centroid estimates based on a degree of audible similarity between any combination of corresponding segments, vectors, or centroids/centroid estimates with the training set of phonemes.

5. The method according to claim 1, wherein the dividing step includes displaying a digitized version of the input audio signal and the operator manually divides using a cursor the displayed signal into segments that correspond to each of the training phonemes.

6. The method according to claim 1, wherein the identifying step includes the operator manually assigning a code to each segment wherein the operator may identify a segment with more than one code if the operator is uncertain of the number of phonemes that the segment may include.

7. The method according to claim 6, wherein the neural network determines which code should be used to classify the segment or whether the segment represents plural phonemes.

8. The method according to claim 1, wherein the transforming step includes transforming a segment into one or more multi-dimensional vectors in the frequency domain using a Fourier transform, each vector including multiple elements some of which represent spectral power in different frequency bands.

9. The method according to claim 8, wherein the fundamental frequency of the segment is filtered out before transformation.

10. The method according to claim 8, further comprising:

reverse transforming the one or more multi-dimensional vectors and audibly reproducing resulting signal to confirm audible similarity with a corresponding one of the training set of phonemes.

11. The method according to claim 10, further comprising:

modifying one or more transformation parameters as a result of the audible confirmation.

12. The method according to claim 1, wherein the neural network is selected by an operator from UCL, SCL, auto-associative, and backpropagation neural networks.

13. The method according to claim 1, further comprising:

testing the developed neural network using another audio signal to determine how well the neural network recognizes phonemes in the another audio signal.

14. A user interface for developing a neural network for speech recognition, comprising:

a display screen that displays speech segments representing phonemes of a speech signal, multiple dimension vectors, each segment being represented by corresponding one or more vectors, a corresponding phoneme code, and a centroid or an estimate of a centroid associated with each phoneme code to permit comparison between adjacent vectors, where similar sounds are coded with similar vectors, wherein the display screen provides qualitative assistance to a user in developing a neural network for speech recognition.

15. The user interface in claim 14 including a speaker in addition to the display screen, wherein the user visibly and audibly confirms the quality of the training set of phonemes.

16. The user interface in claim 14, further comprising:

means for displaying an amplitude of the speech signal;

means for digitizing the speech signal;

means for dividing the digitized signals into speech segments; and means for indicating a starting point and an ending point of each segment.

17. The user interface in claim 16, further comprising:

means for transforming each segment into one or more vectors having plural dimensions, wherein the one or more vectors are displayed on the display screen.

18. The user interface in claim 17, further comprising:

means for assigning the corresponding phoneme code to the one or more vectors, wherein the corresponding phoneme code is displayed.

19. The user interface in claim 17, further comprising:

means for generating the centroid or an estimate of a centroid corresponding to the one or more plural dimension vectors representing a particular phoneme, wherein the centroid or the estimate of a centroid is displayed.

20. The user interface in claim 19, wherein plural centroid vectors or estimates of centroid vectors are determined for each of plural segments, the user interface further comprising:

means for selecting for one of the segments one of the plural centroid vectors or estimates of a centroid vector having a greatest likelihood of corresponding to the one segment.

21. The user interface in claim 16, further comprising:

means for generating an audible signal corresponding to the digitized speech.

22. The user interface in claim 21, further comprising:

means for generating an audible signal corresponding to one or more of the segments.

23. The user interface in claim 17, further comprising:

means for generating an audible signal corresponding to transformed vectors corresponding to a segment.

24. The user interface in claim 19, further comprising:

means for generating an audible signal corresponding to decoded centroids or decoded estimates of centroids.

25. A method for processing speech information using a neural network trained to recognize speech phonemes and generate corresponding phoneme codes, where for each possible phoneme code, an exemplary centroid vector is identified based on an internal structure of the trained neural network, comprising the steps of:

dividing an input speech signal into segments;

transforming each segment into a set of vectors;

the neural network assigning a phoneme code to each vector;

converting a sequence of the phoneme codes into a corresponding sequence of exemplary centroid vectors;

reverse transforming the sequence of exemplary centroid vectors into an output segment of speech; and generating an audio signal using the output speech segment.

26. The method in claim 25, wherein each of the codes represents a compressed amount of speech information.

27. The method in claim 25, further comprising:

displaying one of the phoneme codes and a corresponding exemplary centroid vector.

28. The method in claim 25, wherein the internal structure of the neural network includes the trained neural network weight connections.

29. The method in claim 25, further comprising:

generating an audio signal corresponding to the exemplary centroid vector.

30. The method in claim 25, further comprising:

scaling the output segment of speech.

* * * * *